(12) United States Patent
Burns

(10) Patent No.: US 6,315,097 B1
(45) Date of Patent: Nov. 13, 2001

(54) HYDROMECHANICAL COUPLING WITH ADAPTIVE CLUTCH CONTROL

(75) Inventor: Timothy M. Burns, Jordan, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/538,103

(22) Filed: Mar. 29, 2000

(51) Int. Cl.[7] .................. F16D 43/284; B60K 17/348
(52) U.S. Cl. .................. 192/35; 192/85 AA; 192/103 F
(58) Field of Search .................. 192/85 AA, 103 F, 192/35, 54.3, 82 T; 475/88

(56) References Cited

U.S. PATENT DOCUMENTS

| | | |
|---|---|---|
| 4,719,998 * | 1/1988 | Hiramatsu et al. .......... 192/103 F X |
| 5,024,634 * | 6/1991 | Blessing .................. 475/86 |
| 5,310,388 | 5/1994 | Okcuoglu et al. . |
| 5,536,215 | 7/1996 | Shaffer et al. . |
| 5,595,214 | 1/1997 | Shaffer et al. . |
| 5,611,746 | 3/1997 | Shaffer . |
| 5,735,764 | 4/1998 | Shaffer et al. . |
| 5,749,801 * | 5/1998 | Teraoka et al. .......... 475/88 |
| 5,827,145 | 10/1998 | Okcuoglu . |
| 5,888,163 | 3/1999 | Shaffer et al. . |
| 5,924,948 | 7/1999 | Kwoka . |
| 5,924,952 * | 7/1999 | Bowen .................. 475/313 |
| 5,938,555 | 8/1999 | Leeper . |
| 5,938,556 | 8/1999 | Lowell . |
| 5,938,596 | 8/1999 | Woloszko et al. . |
| 5,954,173 | 9/1999 | Sakai et al. . |
| 5,964,126 | 10/1999 | Okcuoglu . |
| 5,967,285 | 10/1999 | Mohan et al. . |
| 5,989,147 | 11/1999 | Forrest et al. . |
| 6,041,903 | 3/2000 | Burns et al. . |
| 6,048,286 | 4/2000 | Perry . |
| 6,076,646 * | 6/2000 | Burns .................. 192/85 AA |
| 6,095,939 * | 8/2000 | Burns et al. .................. 475/88 |
| 6,112,874 * | 9/2000 | Kopp et al. .................. 192/85 AA |
| 6,129,188 * | 10/2000 | Friedmann et al. .......... 192/85 AA X |
| 6,145,644 * | 11/2000 | Mohan et al. .................. 192/103 F |
| 6,216,841 * | 4/2001 | Hofer .................. 192/103 F |

FOREIGN PATENT DOCUMENTS 4-254021 * 9/1992 (JP) .................. 192/103 F

* cited by examiner

*Primary Examiner*—Rodney H. Bonck
(74) *Attorney, Agent, or Firm*—Harness, Dickey & Pierce

(57) ABSTRACT

A hydraulic coupling for rotatively coupling a first rotary member and a second rotary member in a motor vehicle is provided. The hydraulic coupling includes a coupling housing that defines an at least partially sealed cavity. A clutch is positioned in the cavity and is operable to selectively couple the first rotary member and the second rotary member. A piston assembly selectively engages the clutch in response to a hydraulic pressure. An internal fluid path extends between a supply chamber, a hydraulic pump, a piston chamber, and back to the supply chamber. An electrically powered mover is then disposed within the sealed cavity in the internal fluid path. The electrically powered mover operates to control fluid flow and, thus, hydraulic pressure through the internal fluid path thereby actuating the piston and the clutch. A flow control module monitors the operating conditions of the motor vehicle and controls the electrically powered mover in response to the operating conditions.

44 Claims, 9 Drawing Sheets

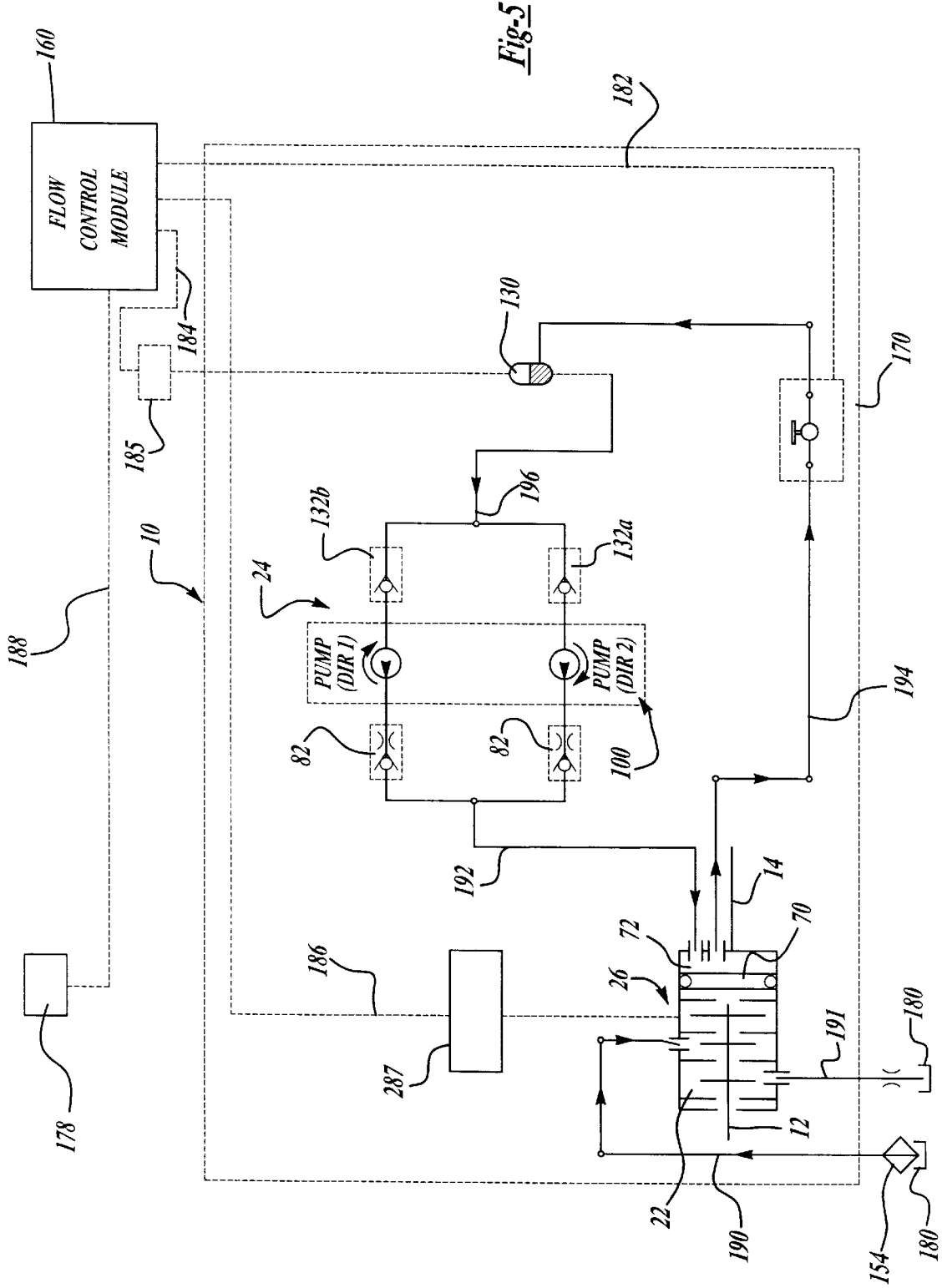

HYDROMECHANICAL COUPLING WITH ADAPTIVE CLUTCH CONTROL

BACKGROUND OF THE INVENTION

The present invention relates generally to hydraulic couplings for use in motor vehicle driveline applications. More specifically, the hydraulic coupling includes a hydraulic pump, a transfer clutch coupled between a pair of rotary members, and a fluid distribution system having a valve control system operable for controlling actuation of the transfer clutch.

Hydraulic couplings are used in a variety of motor vehicle driveline applications for limiting slip and transferring drive torque between a pair of rotary members. In all wheel drive applications, hydraulic couplings have been used to automatically control the transfer of drive torque from a driven member to a non-driven member in response to speed differentiation therebetween. In limited slip applications, such as used in association with a differential in an axle assembly, full-time transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 5,649,459, 5,704,863 and 5,779,013.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

Accordingly, the present invention provides a hydraulic coupling for use in motor vehicle driveline applications for rotatively coupling a pair of rotary members to limit speed differentiation and transfer drive torque therebetween.

The hydraulic coupling according to the invention includes a multi-plate clutch assembly operatively connecting a pair of rotary members, and an actuator assembly for actuating the clutch assembly. The actuator assembly includes a hydraulic pump, a piston disposed in a piston chamber, and a fluid control system for controlling the fluid pressure supplied to the piston chamber by the hydraulic pump to control the clutch engagement force exerted by the piston on the clutch assembly. The fluid control system includes a flow control valve operable for limiting the fluid pressure in the piston chamber. The position of the flow control valve is controlled by a flow control module that monitors and responds to vehicle operating conditions, including fluid temperature in the fluid control system, the difference in rotational velocity between the pair of rotary members, piston chamber pressure, and any other vehicle system information. The flow control module modulates the hydraulic pressure in the piston chamber, which, in turn, controls clutch engagement.

As a further feature of the hydraulic coupling, the fluid control system may draw fluid from a secondary pump or a sump, whereby fluid temperature may be monitored by the flow control module.

As another feature of the hydraulic coupling, the fluid control system may be self-contained, thus not reliant on a supply of fluid from a secondary fluid pump or a sump. The self-contained hydraulic coupling is useful for transfer cases, transaxles, or other drivetrain subsystems that do not include a sump or secondary pump.

As another feature of the hydraulic coupling, the fluid control system may include a temperature-sensitive valve element mounted to the piston for movement in response to and as a function of the temperature, and thus viscosity, of the fluid in the piston chamber. In a first extreme position, the temperature-sensitive valve element blocks flow through a port extending through the piston. In a second extreme position, the temperature-sensitive valve element permits flow through the port to vent the piston chamber and release the clutch assembly. In between the extreme valve positions, the valve element variably restricts flow through the port to accommodate variations in fluid viscosity.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

FIG. 5 is a schematic illustration of a hydraulic circuit associated with the hydraulic coupling of FIG. 1;

DETAILED DESCRIPTION OF THE INVENTION

Figure 1:
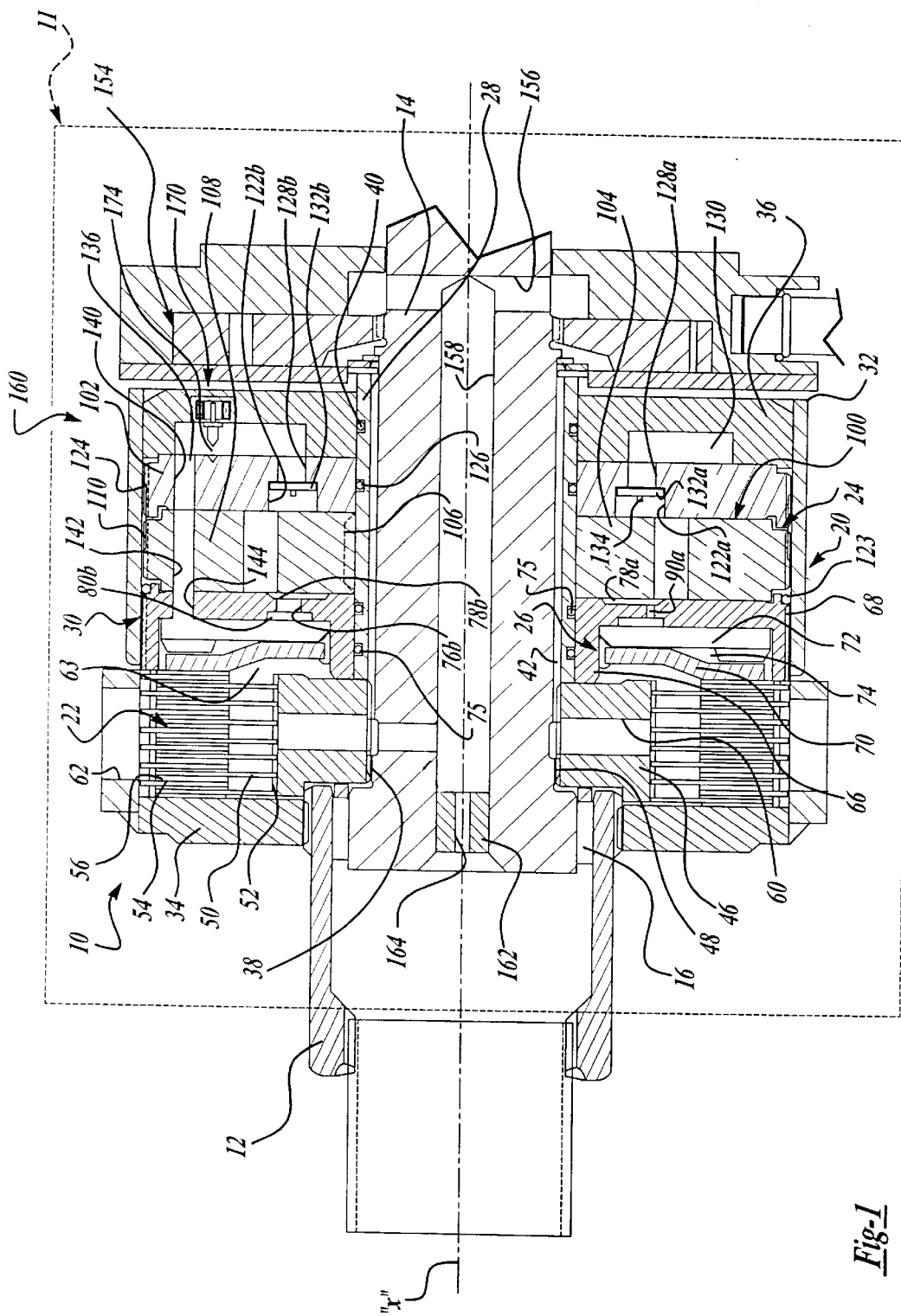
FIG. 1 is a sectional view illustrating a hydraulic coupling according to the present invention operatively coupled between first and second rotary shafts.

In general, the present invention is directed to an actively controlled hydromechanical limited slip and torque transfer apparatus, hereinafter referred to as a hydraulic coupling. Driveline applications for the hydraulic coupling include, but are not limited to, limited slip axle differentials, power take-offs and in-line coupling for all wheel drive vehicles, on-demand couplings and limited slip differentials in four-wheel drive transfer cases, and limited slip differentials in transaxles.

Referring initially to FIGS. 1–5 of the drawings, a hydraulic coupling according to a preferred embodiment of the present invention is generally identified with reference numeral 10. As specifically shown in FIG. 1, hydraulic coupling 10 is located in a driveline apparatus 11 having a housing and is operatively coupled between a first rotary member, hereinafter referred to as first shaft 12, and a second rotary member, hereinafter referred to as second shaft 14. Shafts 12 and 14 are rotatable relative to one another, with first shaft 12 being supported by bearing 16 for rotation relative to second shaft 14. As will become apparent, hydraulic coupling 10 is controlled by a flow control module 160 for progressively coupling shafts 12 and 14. Flow control module 160 monitors vehicle system information and hydraulic coupling information including rotational speed differences between shafts 12 and 14 and controls a flow control valve assembly 170 in hydraulic coupling 10.

Figure 6:
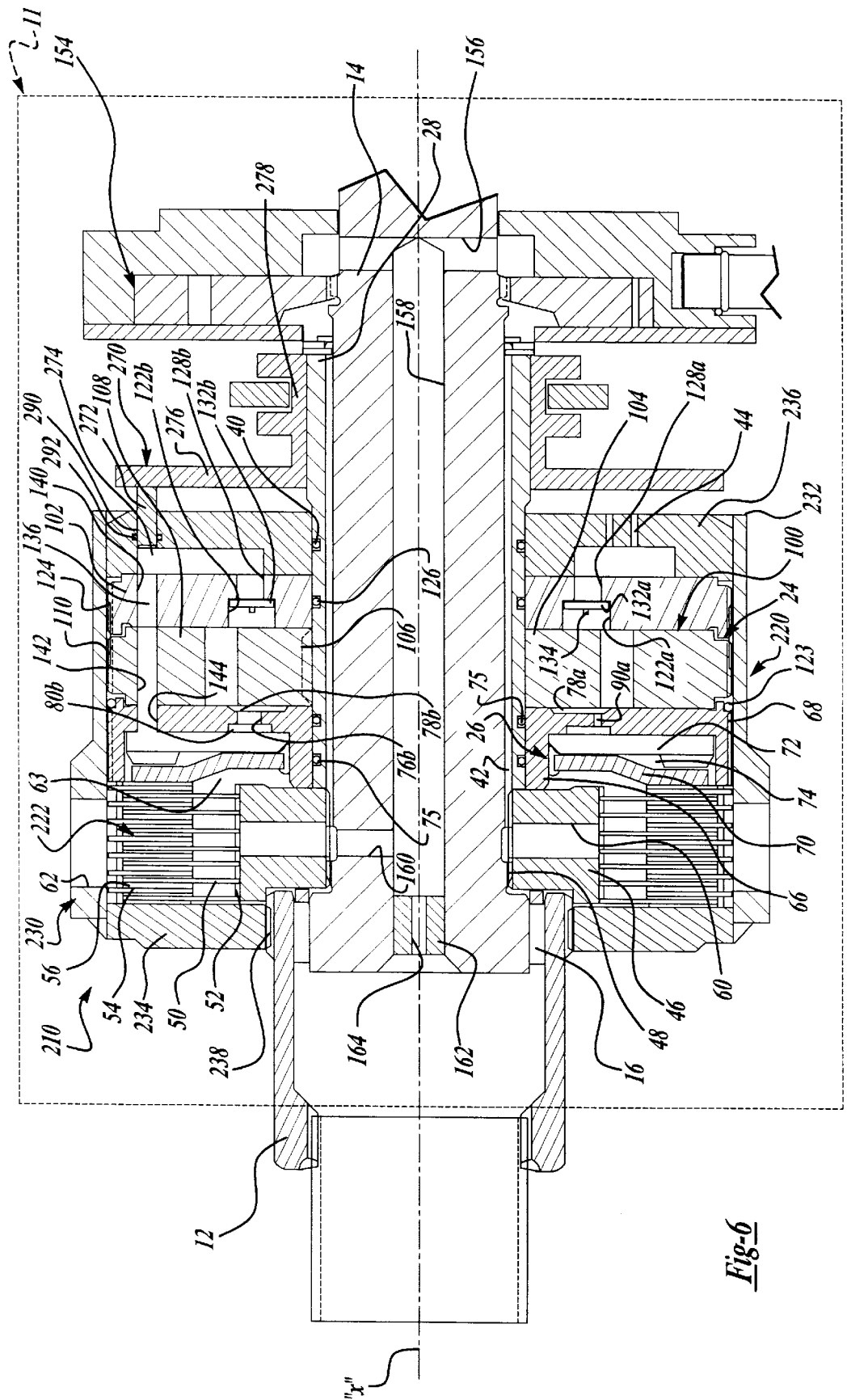
FIG. 6 is a sectional view illustrating another hydraulic coupling according to the present invention operatively coupled between first and second rotary shafts.

In general, hydraulic coupling 10 comprises two portions: a self-contained or "sealed" actuator assembly 20, and a transfer clutch 22 for transferring drive torque from a faster rotating shaft to a slower rotating shaft in response to excessive speed differentiation therebetween. Transfer clutch 22 is a hydraulically actuated multi-plate clutch assembly fixed via splined connection 38 to second shaft 14. Actuator assembly 20 includes a hydraulic pump 24 and a piston assembly 26 that are mounted on a tubular drive shaft 28. Actuator assembly 20 is confined within a cover assembly 30, which includes a cylindrical outer drum 32 secured to a hydraulic coupling housing (not shown), and a cover plate 36 secured (i.e., welded) thereto. An O-ring seal 40 permits drive shaft 28 to rotate relative to cover plate 36 of cover assembly 30 while providing a fluid-tight seal therebetween. In addition, drive shaft 28 is fixed via a splined connection 42 to second shaft 14. Through cylindrical drum 32, cover assembly 30 is stationary relative the hydraulic coupling housing. Alternatively, as shown in FIG. 6 for another version of a hydraulic coupling, cover assembly 30 may house both the actuator assembly and the transfer clutch. A removable plug (not shown) is secured in a fill bore (not shown) formed in cover plate 36 for permitting actuator assembly 20 to be filled with a desired type of hydraulic fluid. Since actuator assembly 20 is sealed relative to the remainder of hydraulic coupling, a preferred type of hydraulic fluid can be used that is different than the hydraulic lubricant entrained in a sump 180 of driveline apparatus 11.

Transfer clutch 22 includes a clutch hub 46 fixed via a splined connection 48 to second shaft 14, and an interleaved clutch pack comprised of a plurality of inner clutch plates 50 fixed via splined connection 52 to clutch hub 46. Inner clutch plates 50 are alternately interleaved with a plurality of outer clutch plates 54 fixed via a splined connection 56 to outer drum 32. Lubrication ports 60 and 62 formed through clutch hub 46 and outer drum 32, respectively, are provided for supplying an adequate supply of lubricating fluid to a clutch chamber 63 for cooling the clutch pack.

Piston assembly 26 includes a piston housing 66 that is fixed via a splined connection 68 to outer drum 32, and an actuation member or piston 70 disposed in an annular piston chamber 72 formed in piston housing 66. Preferably, piston 70 has a cover material 74 bonded thereto, such as rubber, to provide for sealed sliding engagement with respect to inner and outer edge surfaces of piston chamber 72. Thus, piston 70 is supported for axial sliding movement within piston chamber 72 relative to the interleaved multi-plate clutch pack for applying a compressive clutch engagement force thereon, thereby transferring drive torque from second shaft 14 (via clutch hub 46) to first shaft 12 (via cover assembly 32) or vise versa. The amount of drive torque transferred is progressive in that it is proportional to the magnitude of the clutch engagement force exerted by piston 70 on the clutch pack which, in turn, is a function of the fluid pressure within piston chamber 72. The magnitude of the fluid pressure delivered by hydraulic pump 24 to piston chamber 72 is determined by a valve element 172 of flow control valve assembly 170, whose position is controlled by flow control module 160. As seen, a pair of O-ring seals 75 are provided for sealing piston housing 66 for rotation relative to drive shaft 28. Moreover, piston 70 functions to maintain a fluid-tight seal between piston chamber 72 and clutch chamber 63, thereby sealing actuator assembly 20 relative to transfer clutch 22. Furthermore, a sealed actuator chamber is formed between piston chamber 72 and a supply chamber 130 formed in cover plate 36 within outer drum 32.

The hydraulic coupling 10 operates actively or passively, depending on the state of flow control module 160. When flow control module 160 is "on" or controlling flow control valve assembly 170, flow control module 160 actively positions flow control valve element 172 in a flow passage 174 in response to system information monitored by flow control module 160 including the speed differential (i.e., "ΔRPM") between first shaft 14 and second shaft 16. Thus, in the "on" state, the magnitude of the fluid pressure delivered by hydraulic pump 24 to piston chamber 72 is regulated by flow control valve assembly 170. In the "off" state, flow control valve element 172 can be positioned to restrict flow passage 174, either fully or partially, or can be positioned to allow unrestricted flow through passage 174. Because flow control valve assembly 170 is not being actively controlled in the "off" state, valve element 172 is positioned and remains there until flow control module 160 is "on" and thus actively controlling flow control valve assembly 170 based on monitored system information. When "off", valve element preferably returns to a known position defining a predetermined flow passage for conventional hydromechanical coupling of first and second shafts 12, 14 with the assistance of pressure- and temperature-sensitive valve elements. Accordingly, coupling is essentially a function of speed differential when flow control module 160 is in the "off" state.

Figure 2:
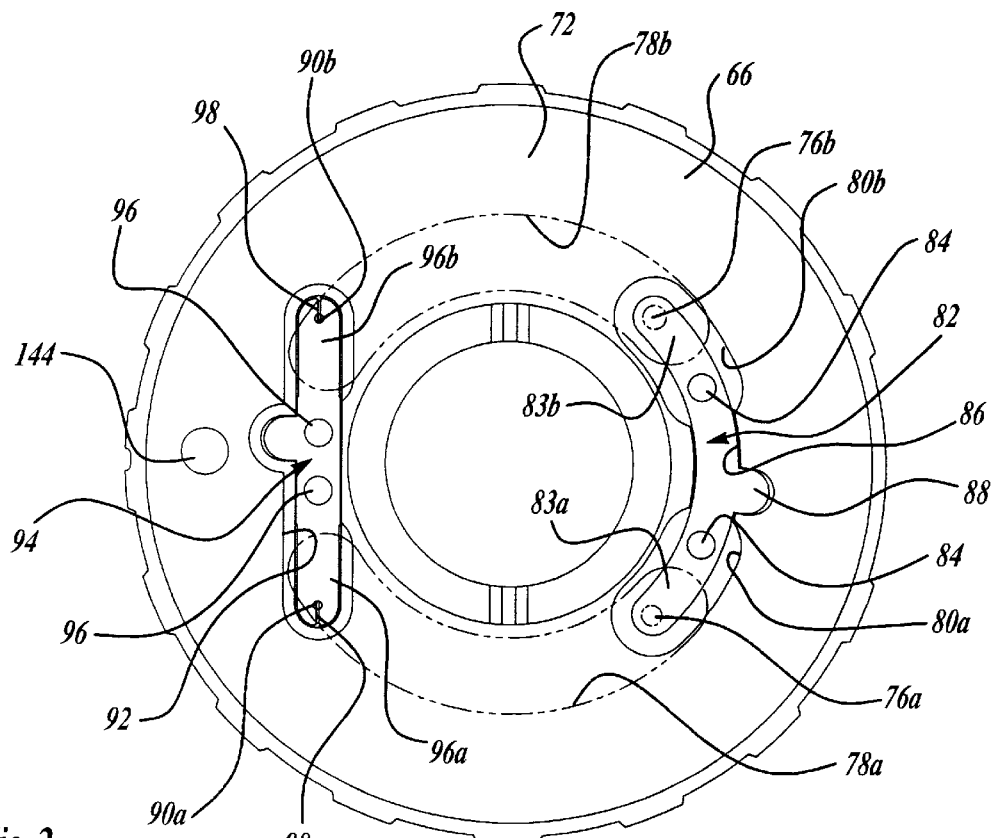
FIG. 2 is a side view of the piston housing associated with the hydraulic coupling according to the present invention.

As shown in FIGS. 1 and 2, piston housing 66 has a valving arrangement associated therewith that is operable for controlling the delivery of fluid under pressure from hydraulic pump 24 to piston chamber 72. In particular, a pair of transfer ports 76a and 76b are formed through piston housing 66 and extend between and communicate with a corresponding one of pump outlet slots 78a and 78b and piston inlet slots 80a and 80b. In addition, a check valve 82 is mounted by rivets 84 in a shallow bridge groove 86 which communicates with both piston inlet slots 80a and 80b. Preferably, check valve 82 is a reed valve element that is symmetrical relative to a central alignment tab 88.

Based on the direction of relative rotation between shafts 12 and 14 (which results in a corresponding directional rotation of hydraulic pump 24 in a first direction), one terminal end 83a of check valve 82 will resiliently deflect to an "open" position away from piston housing 66 and its corresponding transfer port 76a due to the pumping action of hydraulic pump 24 for permitting the flow of high pressure hydraulic fluid from the corresponding pump outlet slot 78a into piston chamber 72. Concurrently, the other terminal end 83b of check valve 82 is maintained in a "closed" position relative to piston housing 66 for inhibiting the discharge of the high pressure hydraulic fluid from piston chamber 72 into the other pump outlet slot 78b through transfer port 76b.

As such, when the hydraulic fluid in piston chamber 72 exceeds a predetermined pressure level, piston 70 is actuated to move toward the clutch pack for applying the resultant clutch engagement force thereon, thereby engaging transfer clutch 22. During the opposite direction of relative rotation between shafts 12 and 14, the open and closed positions mentioned above are reversed for transfer ports 76a and 76b. Upon cessation of the pumping action, both terminal ends 83a and 83b of check valve 82 are biased to return to their respective closed positions for maintaining a supply of fluid in piston chamber 72. Thus, check valve 82 functions as a normally-closed check valve. Separate check valves can be used in association with transfer ports 76a and 76b if so desired.

Figure 4:
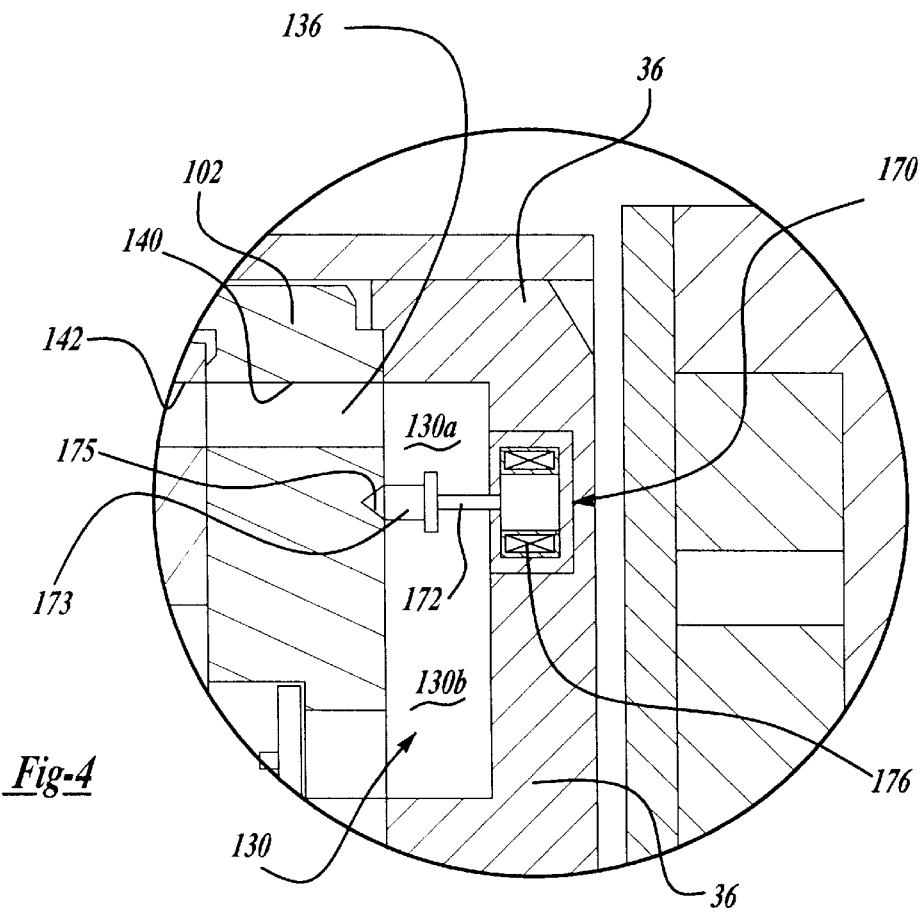
FIG. 4 is a partial sectional view of valve assembly associated with the hydraulic coupling of FIG. 1.

Together, the pumping action of hydraulic pump 24 and the position of flow control valve element 172 cause fluid in piston chamber 72 to exceed the predetermined minimum pressure. Accordingly, when the flow control module 160 is "on", actuation of transfer clutch 22 is controlled by the position of valve element 172 of flow control valve assembly 170 as fluid pressure changes in response to the speed differential between shafts 12 and 14. Conversely, when flow control module 160 is "off", actuation of transfer clutch 22 only occurs when the speed differential, and thus the pumping action of hydraulic pump 24, exceeds a predetermined minimum ΔRPM value dictated by the static position of valve element 172 in flow passage 174. Further, if valve element 172 does not restrict flow passage 174, hydraulic pump 24 short circuits, in which case transfer clutch 22 is not actuated because no fluid pressure can accumulate in piston chamber 72. Or, if valve element 172 completely blocks flow passage 174, as shown in FIG. 4, hydraulic pump 24 dead-heads, in which case piston chamber 72 is subject to significant fluid pressure and hydraulic pump 24 can not draw any hydraulic fluid from supply chamber 130. By statically positioning valve element 172 somewhere therebetween these two extreme positions, as shown in FIG. 1, actuation of the transfer clutch occurs at a speed differential between rotating shafts 12 and 14 corresponding to the opening in flow passage 174 defined by valve element 172. Thus, for this latter situation, hydraulic coupling 10 operates similar to the hydraulic coupling described in U.S. patent application Ser. No. 09/176,807, filed Oct. 22, 1998, incorporated herein by reference.

As best seen from FIG. 2, piston housing 66 also includes a pair of outlet ports 90a and 90b, which communicate with corresponding pump outlet slots 78a and 78b and a chamfered bridge slot 92. The valving arrangement associated with piston housing 66 further includes a control valve 94 mounted by rivets 96 within bridge slot 92 and which is operable for setting the predetermined pressure level within piston chamber 72 at which transfer clutch 22 is initially actuated and for compensating for temperature gradients caused during heating of the hydraulic fluid in actuator assembly 20.

In a variation of the invention, control valve 94 is a bimetallic valve element that is normally maintained with both of its terminal ends 96a and 96b in an "open" position displaced from piston housing 66 for permitting flow of hydraulic fluid into piston chamber 72 through one of ports 90a and 90b while also discharging hydraulic fluid from piston chamber 72 to a lower pressure section of pump 24 through the other of outlet ports 90a and 90b. Because control valve 94 is of the laminated bimetallic type, the different thermal expansion coefficients of the laminated valve strips cause the ends of control valve 94 to move as its temperature varies for controlling discharge flow through the corresponding one of outlet ports 90a and 90b regardless of changes in the viscosity of the hydraulic fluid caused by temperature variations.

Where control valve 94 is a bimetallic valve, flow control module 160 need not monitor fluid temperature, nor position flow control valve element 172 in flow passage 174 to accommodate the change in viscosity. Such an arrangement is particularly useful in a self-contained, rotating actuator assembly 20 where monitoring of the fluid temperature is more difficult. Because in this embodiment cover assembly 30 of actuating assembly 20 is grounded to the hydraulic coupling housing (not shown), direct fluid temperature measurement is preferred. That said, it still may be preferred to include a bimetallic control valve 94 for temperature-responsive operation of outlet ports 90a and 90b when flow control module 160 is not actively controlling valve element 172, which is statically positioned to define a predetermined opening in flow passage 174. In this case, temperature compensation by a bimetallic control valve 94 assures proper actuation of the transfer clutch at the predetermined speed differential between rotating shafts 12 and 14 corresponding to the opening in flow passage 174 defined by valve element 172.

Once the fluid in piston chamber 64 exceeds a predetermined minimum pressure value, terminal end of control valve 94 controlling flow out of piston chamber 64 moves to its "closed" position against piston housing 66 for inhibiting fluid flow through the corresponding outlet port. As such, a significant pressure increase occurs in piston chamber 72 that causes piston 70 to apply a corresponding clutch engagement force on the clutch pack and actuate transfer clutch 22. The pumping action of hydraulic pump 24 and the position of flow control valve element 172 in flow passage 174 cause fluid in piston chamber 72 to exceed the predetermined minimum pressure.

As is also seen, terminal ends 96a and 96b of control valve 94 are each formed to include a small bleed passage or slot 98 that permit a small amount of bleed flow out of piston chamber 72 even when control valve 94 is closed. This continuous bleed flow provides a gradual release of the pressure in piston chamber 72 for disengaging transfer clutch 22. As noted, opposite relative rotation between shafts 12 and 14 will result in the opened and closed positions of terminal ends 96a and 96b of control valve 94 being reversed.

Hydraulic pump 24 is operable for pumping hydraulic fluid, as regulated by flow control valve assembly 170, through transfer ports 76a and 76b and into piston chamber 72 for actuating transfer clutch 22. Hydraulic pump 24 is installed in the sealed actuator chamber and, preferably, is a rotary type bi-directional pump. In this regard, hydraulic pump 24 is shown to include a gerotor pump assembly 100 and a pump housing 102.

Figure 3:
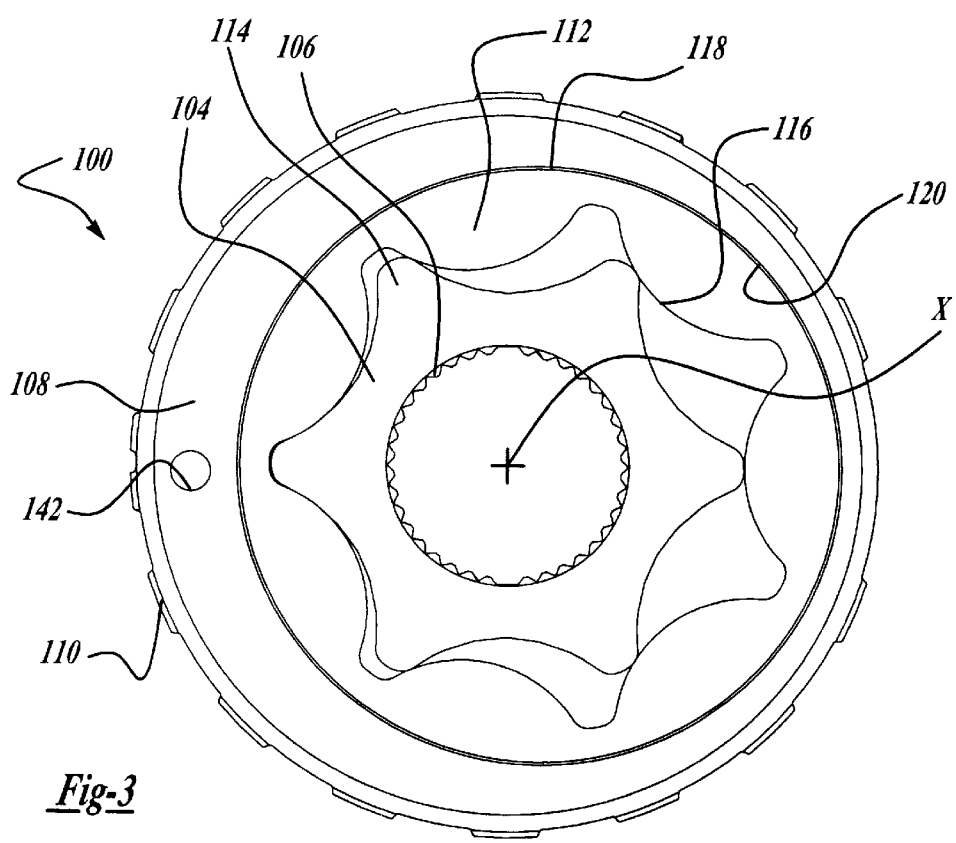
FIG. 3 is a side view of the hydraulic pump associated with the hydraulic coupling according to the present invention.

Gerotor pump assembly 100, as viewed in FIGS. 1 and 3, is a bi-directional arrangement including a pump ring 104 that is fixed via a splined connection 106 to drive shaft 28, an eccentric ring 108 that is fixed via a splined connection 110 to outer drum 32, and a stator ring 112 that is operably disposed therebetween. Pump ring 104 has a plurality of external teeth 114 that rotate concentrically relative to shaft 14 about a common rotational axis, as denoted by axis line "X". As shown best in FIG. 3, stator ring 112 includes a plurality of internal lobes 116 and has an outer circumferential edge surface 118 that is journally rotatably supported within a circular internal bore 120 formed in eccentric ring 108. Internal bore 120 is offset from the rotational axis "X" such that, due to meshing of internal lobes 116 of stator ring 112 with external teeth 114 of pump ring 104, relative rotation between pump ring 104 and eccentric ring 108 causes eccentric rotation of stator ring 112. Based on the direction of relative rotation, this eccentric rotary arrangement results in a pumping action for supplying fluid under pressure from one of pump inlet slots 122a and 122b formed in pump housing 102 to a corresponding one of pump outlet slots 78a and 78b formed in piston housing 66. Preferably, stator ring 112 has a number of lobes 116 that is one more than the number of teeth 114 provided on pump ring 104.

Referring primarily to FIG. 1, gerotor pump assembly 100 is shown operably installed between piston housing 66 and pump housing 102. An O-ring seal 123 provides a fluid tight seal between the outer peripheral edges of eccentric ring 108 and piston housing 66. Pump housing 102 is likewise shown to have its outer peripheral surface fixed via a splined connection 124 for rotation with outer drum 32 while its inner peripheral surface is journally supported for rotation relative to drive shaft 28 and is sealed relative thereto by an O-ring seal 126. Pump housing 102 is formed to include a series of inlet ports 128a and 128b formed respectively with pump inlet slots 122a and 122b to provide fluid communication with an internal reservoir defined by annular supply chamber 130 that is located on a supply side of the gerotor pump assembly 100 and is formed in cover plate 36. Check valves 132a and 132b are mounted by rivets 134 within corresponding pump inlet slots 122a and 122b for controlling the delivery of fluid from supply chamber 130 through inlet ports 128a and 128b to pump inlet slots 122a and 122b. Check valves 132a and 132b are preferably reed valve elements which overlie inlet ports 128a and 128b and which are movable on rivets 134 from a "closed" position abutting pump housing 102 to an "open" position displaced from pump housing 102 in response to pumping action of gerotor pump assembly 100. Rotation in a first direction causes check valve 132a to move to its open position while check valve 132b is maintained in its closed position. Opposite rotation causes opposite movement of check valves 132a and 132b: check valve 132b opens while check valve 132a closes. Upon cessation of the pumping action, check valves 132a and 132b return to their normally closed positions for maintaining a supply of fluid within inlet slots 122a and 122b.

With reference to FIG. 1, hydraulic coupling 10 further includes a fluid path 136 for permitting fluid in the sealed actuator chamber to flow from piston chamber 72 to supply chamber 130. Fluid path 136 is defined by a series of aligned apertures including an aperture 140 extending axially through inlet plate 102, an aperture 142 extending axially through eccentric ring 108, and an aperture 144 passing axially through piston housing 66. In accordance with the embodiment shown, flow control valve assembly 170 is supported from cover plate 36 with flow control valve element 172 extending into supply chamber 130 so as to define an upper portion 130a and a lower portion 130b thereof. As seen, upper portion 130a of supply chamber 130 is in fluid communication with fluid path 136 while lower portion 130b of supply chamber 130 is in fluid communication with pump inlet ports 128a and 128b. Upper portion 130a and lower portion 130b are in fluid communication via a variable flow restriction passage 174 defined between a pintle end 173 of valve element 172 and a valve seat 175 formed in inlet plate 102. The area of flow restriction passage 174 varies based on the position of pintle end 173 of valve element 172 relative to valve seat 175.

By controlling actuation of flow control valve assembly 170, the size of flow restriction 174 can be varied. In the exemplary embodiment, flow control valve assembly 170 is actuated by a solenoid 176 selectively energized by flow control module 160 to variably position valve element 172 in flow restriction passage 174. Of course, many different types of valve actuators can be used. Further, as one of skill in the art will readily recognize, many different valve types can be incorporated into hydraulic coupling 10 according to the invention, including rotary valves, disc valves, spool valves, etc. The flow area of passage 174, as varied by valve element 172, as well as the relationship between the size of transfer posts 76, outlet ports 90 and bleed slots 98, in conjunction with the operational characteristics of control valve 94, permit hydraulic coupling 10 to be actively "tuned" to define the particular speed differential value between shafts 12 and 14 at which torque transfer will begin (i.e., when the clamping force on the clutch pack is of a magnitude to transfer torque). Tuning through modulation of flow control valve element 172 is actively performed by flow control module 160, which can be programmed to monitor fluid characteristics and engine performance.

Driveline apparatus 11 is shown in FIG. 1 to further include a lube pump 154 that is operable for drawing lubricant fluid from sump 180 provided within apparatus 11 and supplying the lubricant fluid to cool the clutch pack. In particular, lube pump 154 is a shaft-driven hydraulic pump, such as a gerotor pump, which pumps lubricant fluid into a fluid pathway in shaft 14 for delivery to hub port 60. The fluid pathway is shown to include a radial bore 156, a central longitudinal bore 158 and radial ports 160. A plug 162 with an orifice 164 is retained in bore 158 to direct fluid into radial ports 160 without pressurizing the clutch pack while still lubricating and cooling the clutch pack. Since actuator assembly 20 is sealed relative to transfer clutch 22, the hydraulic fluid within the actuator chamber is of different type than that used in the sump of driveline apparatus 11.

In operation, fluid is drawn from supply chamber 130, as limited by flow control valve assembly 170, into the inlet side of gerotor pump assembly 100 when relative motion between the components of gerotor pump assembly 100 commences. As permitted, fluid transfers from supply chamber 130 through one of pump inlet slots 122a and 122b to the high pressure discharge side of gerotor pump assembly 100. The fluid then flows past check valve 94. Within piston chamber 72, the fluid is routed back into the inlet side of gerotor pump assembly 100 via control valve 94 or is fed back toward supply reservoir 130 via fluid path 136, as limited by flow control valve assembly 170. Once the fluid reaches supply reservoir 130, it remains there until once again drawn into the inlet side of gerotor pump assembly 100.

Hydraulic coupling 10 is illustrated schematically in FIG. 5. Flow control module 160 of hydraulic coupling 10 monitors vehicle system information including, without limitation, information from any electronic control module, hydraulic fluid temperature in actuator assembly 20, and the difference in rotational velocity between first and second rotating shafts 12 and 14. Concerning electronic control modules, automotive systems such as anti-lock braking control, engine control, navigation, and vehicle dynamics typically incorporate at least one microcontroller within their electronic control module to perform necessary control functions.

Flow control module 160 is interconnected to these electronic control modules to monitor any relevant information and control flow control valve assembly 170 according to monitored system information. Flow control module 160 is also an electronic control module, and, as is typical of such electronic control modules, includes a central processing unit for executing instructions and decisions according to the circuitry of its microcontroller. Flow control module 160 is preferably a typical 16-bit CPU programmed to respond appropriately to changing vehicle system information. The program instructions are preferably on-chip, and accessed over an internal data bus. Alternatively, such instructions can be off-chip and accessed by the microcontroller of an external address/data bus. Flow control module 160 preferably includes, or is connected to, sensing devices that continuously measure operating conditions, including other electronic control modules. Furthermore, control module 160 functions to evaluate such sensor inputs using data tables and calculations, and determines the output signal sent to flow control valve assembly 170. As will be appreciated, valve element 172 moves in response to the output signals received from flow control module 160. Measuring the rotational velocity difference between shafts 12 and 14 is important to determine when clutch engagement and torque transfer should commence. Monitoring hydraulic fluid temperature permits flow control module 160 to position valve assembly 170 to accommodate changes in viscosity. By monitoring other vehicle electronic control modules, flow control module 160 provides the needed accuracy and adaptability in order to minimize exhaust emissions and fuel consumption, provide optimal drive ability for all operating conditions, minimize evaporative emissions, and provide system diagnosis when malfunctions occur.

With continued reference to FIG. 5, hydraulic coupling 10 includes transfer clutch 22 coupled between first shaft 12 and second shaft 14, hydraulic pump 24, piston 70 disposed in piston chamber 72, and flow control valve assembly 170 for regulating the fluid pressure delivered by hydraulic pump 24 to piston chamber 72. A first flow path 196 draws hydraulic fluid from supply chamber 130 located on the suction side of pump assembly 24, and a second flow path 192 supplies the hydraulic fluid to piston chamber 72 located on the discharge side of hydraulic pump 24. A third flow path 194 returns fluid to supply chamber 130. Flow control valve assembly 170 is located in third flow path 194 and is operable to vary the flow of fluid therein. A first lubricant fluid flow path 190 includes lube pump 154 for drawing lubricant fluid from sump 180 within apparatus 11 for supplying lubricant fluid to cool transfer clutch 22. The lubricant fluid is returned to sump 180 via a second lubricant fluid flow path 191.

Flow control valve assembly 170 is operably connected to flow control module 160 via a first electrical connection 182 to solenoid 176, which permits flow control module 160 to control movement of valve element 172 and provide feedback response to flow control module 160 regarding the position of valve element 172. Preferably, flow control module 160 selectively energizes solenoid 176 to control the position of valve element 172 in flow restriction passage 174. Flow control module 160 controls the position of valve element 172 in response to sensory inputs monitored by or delivered to flow control module 160. In particular, second electrical connection 184 permits flow control module 160 to monitor fluid temperature in supply chamber 130 via a temperature sensor 185. Third electrical connection 186 permits flow control module to monitor a difference in rotation of velocity between first and second shafts 12 and 14 via speed sensors 187. Fourth electrical connection 188 permits flow control module 160 to monitor one or more vehicle electronic control modules 178. For purposes of this description, only one vehicle electronic control module 178 has been shown in the schematic with the understanding that more electronic control modules may be monitored with each having their own electrical connection to flow control module 160. Based on the one or more monitored sensory inputs, flow control module 160 positions valve assembly 170 according to programmed instructions contained in its memory.

In a variation of the invention, a hydraulic coupling 210 is illustrated in FIG. 6. For simplicity in describing hydraulic coupling 210, the same reference numerals used to describe parts of coupling 10 are employed to describe similar parts of coupling 210. Different reference numerals are used where the parts are different.

Hydraulic coupling 210 includes a self-contained or "sealed" actuator assembly 220 operably arranged to actuate a transfer clutch 222 for transferring drive torque from a faster rotating shaft to a slower rotating shaft in response to excessive speed differentiation therebetween. Actuator assembly 220 includes a hydraulic pump 24, a piston assembly 26, and a flow control valve assembly 270 that are mounted on a tubular drive shaft 28. Transfer clutch 222 is a hydraulically actuated multi-plate clutch assembly. Hydraulic pump 24, piston assembly 26, and transfer clutch 22 are combined within a cover assembly 230. Cover assembly 230 includes a cylindrical outer drum 232 and first and second cover plates 234 and 236, respectively, secured (i.e., welded) thereto. First cover plate 234 is shown fixed via a splined connection 238 to first shaft 12 such that cover assembly 230 drives or is driven by first shaft 12. An O-ring seal 40 permits second cover plate 236 of cover assembly 230 and flow control valve assembly 270 of actuator assembly 220 to rotate relative to drive shaft 28 while providing a fluid-tight seal therebetween. In addition, drive shaft 28 is fixed via a splined connection 42 to second shaft 14. Further, flow control valve assembly 270 is journalled on drive shaft 28. In this regard, second cover plate 236 and flow control valve assembly 270 are rotatable relative to drive shaft 28 while flow control valve assembly 270 is axially moveable relative to second cover plate 236 and drive shaft 28.

Similar to the previously described version of the invention, the amount of drive torque transferred from second shaft 14 (via clutch hub 46) to first shaft 12 (via cover assembly 232), or vice versa, is a function of the magnitude of the clutch engagement force exerted by piston 70 on the clutch pack, which, in turn, is a function of fluid pressure in piston chamber 72. The magnitude of the fluid pressure delivered by hydraulic pump 24 to piston chamber 72 is determined by one or more valve elements 272 associated with flow control valve assembly 270, whose position is controlled by flow control module 160. While the magnitude of the fluid pressure delivered is modulated by flow control valve assembly 270, the magnitude of fluid pressure available for delivery to piston chamber 72 by hydraulic pump 24 is largely a function of the speed differential between first shaft 12 and second shaft 14.

Figure 7:
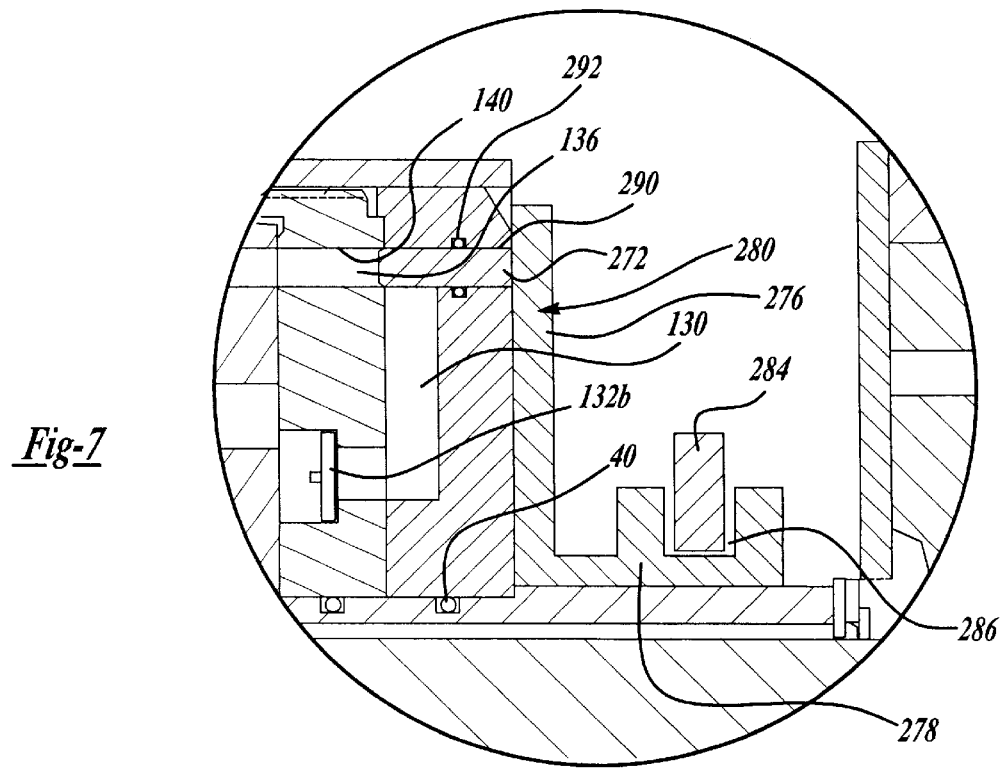
FIG. 7 is a partial sectional view of the flow control valve assembly associated with the hydraulic coupling of FIG. 6.

Also similar to the prior described embodiment, hydraulic coupling 210 operates actively or passively, depending on the state of flow control module 160. When flow control module 160 is "on" or controlling flow control valve assembly 270, flow control module 160 positions flow control valve element 272 in response to system information monitored by flow control module 160, including the speed differential between first shaft 14 and second shaft 16. Thus, in the "on" state, the magnitude of the fluid pressure delivered by hydraulic pump 24 to piston chamber 72 is regulated by flow control valve assembly 270. In the "off" state, flow control valve element 272 is statically positioned in a flow restriction passage 274 to restrict, either partially or fully, or allow unrestricted fluid flow between fluid path 136 and supply chamber 130. As before, if valve element 272 is partially restricting flow restriction passage 274, the magnitude of the fluid pressure delivered by hydraulic pump 24 to piston chamber 72 is essentially a function of the speed differential between first shaft 14 and second shaft 16 and the area of flow in passage 274. When flow passage 274 is blocked, as shown in FIG. 7, hydraulic pump 24 will dead-head. In contrast, when flow passage 24 is unrestricted, as shown in FIG. 6, hydraulic pump 24 will short circuit.

As before, the pumping action of hydraulic pump 24 and the position of flow control valve element 272 cause fluid in piston chamber 72 to exceed the predetermined minimum pressure. Accordingly, when flow control module 160 is "on", actuation of transfer clutch 222 is controlled by the position of flow control valve element 272 as fluid pressure changes in response to the speed differential between shafts 12 and 14. Conversely when flow control module 160 is "off", the valve element preferably returns to a known position defining a predetermined restriction of flow passage 174 and actuation of transfer clutch 22 may only occur when the speed differential, and thus the pumping action of hydraulic pump 24, exceeds a predetermined minimum speed differential, except where hydraulic pump 24 is short-circuited or dead-headed by the either extreme position of valve element 272.

Like the prior embodiment, piston housing 66 includes a pair of outlet ports 90a and 90b, as best shown in FIG. 2, which communicate with corresponding pump outlet slots 78a and 78b and a chamfered bridge slot 92. The valving arrangement associated with piston housing 66 further includes a control valve 94 mounted by rivets 96 within bridge slot 92 and which is operable for setting the predetermined pressure level within piston chamber 72 at which transfer clutch 222 is initially actuated and for compensating for temperature gradients caused during heating of the hydraulic fluid in actuator assembly 220. As before, the control valve 94 may be a bimetallic valve element that is normally maintained with both of its terminal ends 96a and 96b in a "open" position displaced from piston housing 66 for permitting flow of hydraulic fluid into piston chamber 72 through one of ports 90a and 90b while also discharging hydraulic fluid from piston chamber 72 to a lower pressure section of pump 24 through the other of outlet ports 90a and 90b. When control valve 94 is of the laminated bimetallic type, the differential thermal expansion coefficients of the laminated valve strips cause the ends of control valve 94 to move as its temperature varies for controlling discharged flow through the corresponding one of outlet ports 90a and 90b regardless of changes in the viscosity of the hydraulic fluid caused by temperature variations.

Of course, control valve 94 need not be of the bimetallic type, in which case flow control module 160 monitors fluid temperature and positions flow control valve assembly 270 to accommodate the change in viscosity. Conversely, where control valve 94 is a bimetallic valve element, the flow control module 160 need not monitor fluid temperature, nor position flow control valve assembly 270 to accommodate the change in viscosity. This latter arrangement is particularly useful in a self-contained, rotating actuator assembly 20, s described in this embodiment, where monitoring fluid temperature is more difficult due to containment of the fluid in the actuator assembly 20.

Hydraulic coupling 210 further includes fluid path 136 for permitting fluid in the sealed actuator chamber to flow from the piston chamber 72 to supply chamber 130. As before, fluid path 136 is defined by a series of aligned apertures including aperture 140 extending axially through inlet plate 102, aperture 142 extending axially through eccentric ring 108, and aperture 144 passing axially through piston housing 66. Valve element 272 is arranged to vary the area of fluid restriction passage 274 between aperture 140 in inlet plate 102 and supply chamber 130 in cover plate 36 of pump housing 102.

Flow control valve assembly 270 has a valve body including a radial plate segment 276 which supports valve element 272 and a tubular sleeve segment 278 journalled (or supported by bearings) on drive shaft 28. Axial movement of valve body 280, preferably accomplished by a power-operated positioning system 283, varies the position of valve element 272 in flow passage 274. Specifically, valve element 272 is a cylindrical pin that is slidably received in a valve opening 290 formed through second cover plate 236 of pump housing 102. Valve opening 290 includes an O-ring 292 seated therein providing a tight, sealed fit of valve element 272 in valve opening 290. A portion of a shift fork 284 is shown retained in an annular groove 286 formed in sleeve segment 278 of valve body 280. Shift fork 284 is coupled to positioning system 283 which is capable of controllably sliding valve body 280 in response to signals provided by flow control module 160.

Flow control valve assembly 270 is axially moveable to a first extreme position in which valve element 272 is fully retracted from flow passage 274, as shown in FIG. 6, for providing unrestricted flow of fluid from piston chamber 72 to supply chamber 130, thereby short-circuiting hydraulic pump 24. In an opposite second extreme position, as shown in FIG. 7, valve element 272 is fully extended to block flow passage 136 at aperture 140 in inlet plate 102, thereby stopping fluid flow from piston chamber 72 to supply chamber 130 and dead-heading hydraulic pump 24. Between the two defined extreme positions, valve element 272 variably restricts the flow of fluid from piston chamber 72 to supply chamber 130 in response to position signals from flow control module 160. Thus, based on system information including speed differential between shafts 12 and 14, flow control module 160 is able to control the transfer of drive torque from a faster rotating shaft to a slower rotating shaft by appropriately positioning valve element 272 in flow passage 136. The flow area between aperture 140 in inlet plate 102 and supply chamber 130 in cover plate 36, as varied by signals sent to positioning system 283 by flow control module 160, as well as the relationship between the sides of transfer port 76, outlet ports 90, and bleed slots 98, further in conjunction with the operational characteristics of control valve 94, permit hydraulic coupling 210 to be calibrated to define the particular speed differential value between shafts 12 and 14 at which torque transfer commences. Further, calibration is actively performed by flow control module 160 through movement of flow control valve assembly 270 based on monitored fluid characteristics and engine performance.

Flow control module 160 of hydraulic coupling 210 monitors vehicle system information including information from any electronic control module and the difference in rotational velocity between first and second rotating shafts 12 and 14, but preferably not hydraulic fluid temperature in actuator assembly 220 since actuator assembly 220 rotates with piston assembly 26 thereby making temperature sensing difficult. As before, flow control module 160 preferably includes, or is connected to, sensing devices that continuously measure operating conditions, including other electronic control modules and evaluates the sensor inputs using data tables and calculations. Flow control module 160 determines the output signal delivered to an electrically operated actuator of positioning system 283 such that valve element 272 moves in response to such signals.

Figure 8:
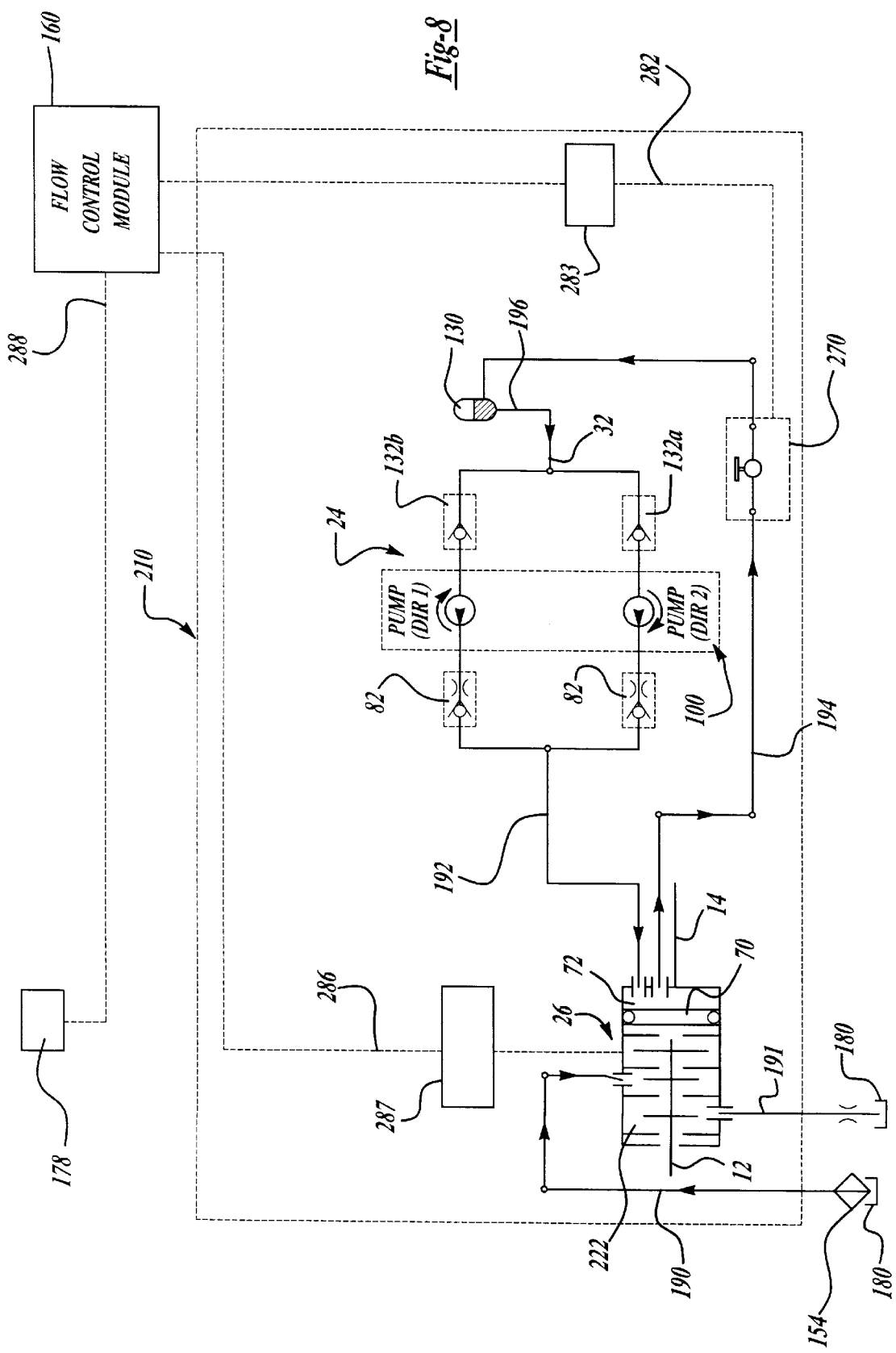
FIG. 8 is a schematic illustration of a hydraulic circuit associated with the hydraulic coupling of FIG. 6.

With reference to FIG. 8, hydraulic coupling 210 is schematically shown to include transfer clutch 222 coupled between first shaft 12 and second shaft 14, hydraulic pump 24, piston 70 disposed in piston chamber 72, and flow control valve assembly 270 for regulating the fluid pressure delivered by hydraulic pump 24 to piston chamber 72. A first flow path 196 supplies hydraulic fluid from supply chamber 130 located on the suction side of pump assembly 24, and a second flow path 192 supplies hydraulic fluid from supply chamber 130 to piston chamber 72 located on the discharge side of hydraulic pump 24. A third flow path 194 returns fluid to supply chamber 130. Flow control valve assembly 270 is located in third flow path 194 and is operable to vary the flow of fluid therein. A first lubricant fluid flow path 190 includes lube pump 154 for drawing lubricant fluid from sump 180 within apparatus 11 for supplying lubricant fluid to cool transfer clutch 22. The lubricant fluid is returned to sump 180 via second lubricant fluid flow path 191.

Flow control valve assembly 270 is connected to an actuator associated with positioning system 283, which receives control signals from flow control module 160 via a first electrical connection 282. Flow control module 160 controls the position of valve element 272 in response to sensory inputs monitored by flow control module 160. Second electrical connection 286 permits flow control module to monitor a difference in rotation of velocity between first and second shafts 12 and 14 based on signals generated by speed sensors 287. Third electrical connection 288 permits flow control module 160 to monitor one or more vehicle electronic control modules 178. For purposes of this description, only one vehicle electronic control module 178 has been shown with the understanding that more electronic control modules may be monitored with each having their own electrical connection to flow control module 160. Based on the one or more monitored sensory inputs, flow control module 160 positions valve element 272 according to programmed instructions contained in its memory.

Figure 9:
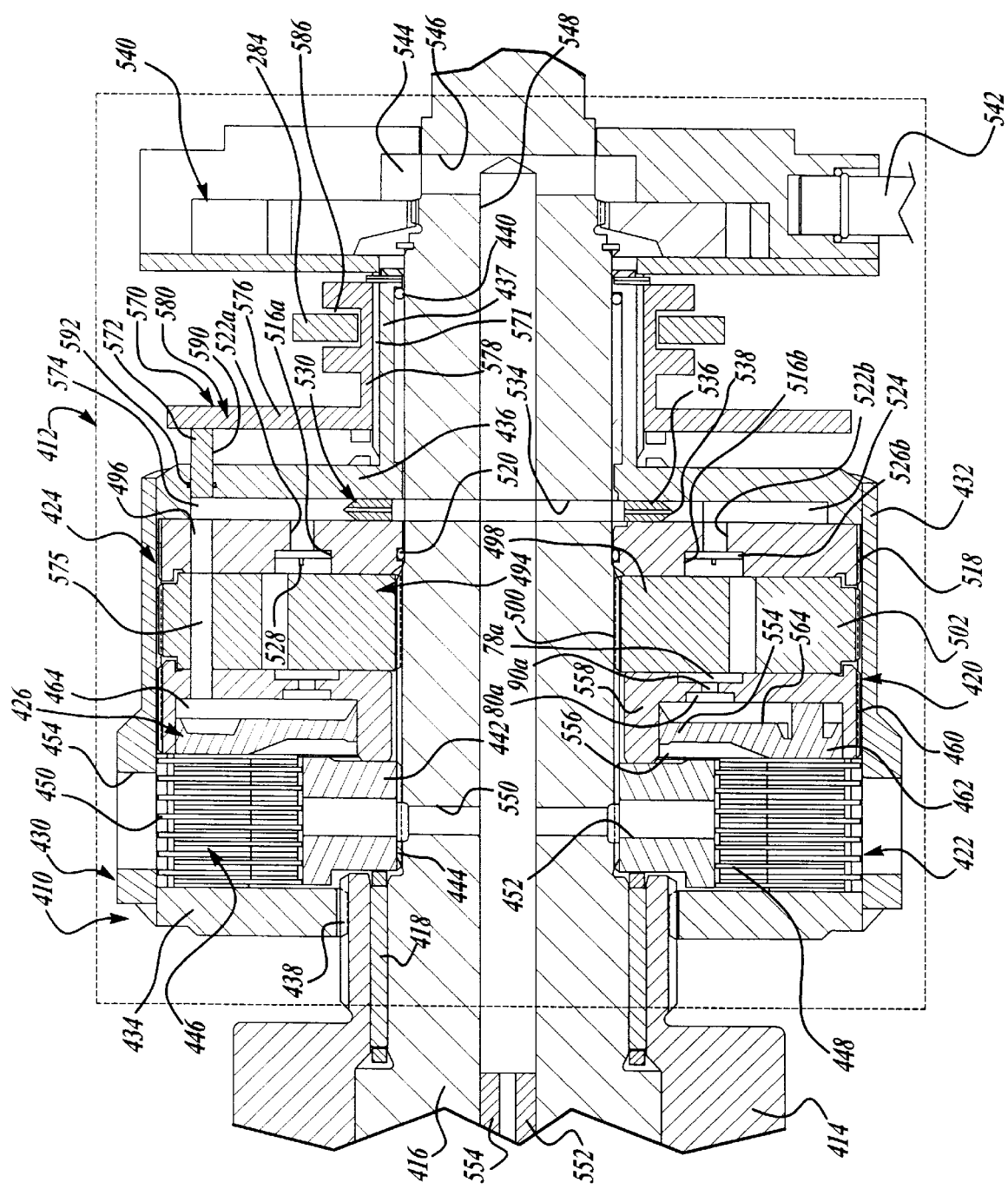
FIG. 9 is a sectional view illustrating another hydraulic coupling according to the present invention operatively coupled between first and second rotary shafts.

Referring initially to FIG. 9 of the drawings, a variation of the hydraulic coupling of the present invention is generally identified with reference numeral 410. Hydraulic coupling 410 includes a flow control valve assembly 570 that is generally similar to flow control valve assembly 270 described for hydraulic coupling 210, but which draws fluid from a sump 426 via secondary supply pump 440. As before, the flow control valve assembly is controlled by a flow control module 160.

As shown, hydraulic coupling 410 is located in a driveline apparatus 412 and is operatively coupled between a first rotary member, hereinafter referred to as first shaft 414, and a second rotary member, hereinafter referred to as second shaft 416. Shafts 414 and 416 are rotatable relative to one another, with first shaft 414 being supported by bearing 418 for rotation relative to second shaft 416. As will become apparent below, hydraulic coupling 410 is adapted to selectively and progressively couple shafts 414 and 416 in response to rotational speed differences therebetween.

In general, hydraulic coupling 410 is illustrated to include an actuator assembly 420 operably arranged to actuate a transfer clutch 422 for transferring drive torque to the slower rotating shaft in response to excessive speed differentiation therebetween. Actuator assembly 420 includes a hydraulic pump 424, a piston assembly 426 and a flow control valve assembly 570, while transfer clutch 422 is a multi-plate clutch assembly. Both actuator assembly 420 and transfer clutch 422 are confined within a cover assembly 430.

Cover assembly 430 includes a cylindrical outer drum 432 and first and second cover plates 434 and 436, respectively, secured (i.e., welded) to opposite ends of outer drum 432. First cover plate 434 is shown fixed via a splined connection 438 to first shaft 414 such that cover assembly 430 rotates with first shaft 414. An O-ring seal 440 permits second cover plate 436 of cover assembly 430 and flow control valve assembly 570 of actuator assembly 420 to rotate relative to second shaft 416 while providing a fluid-tight seal therebetween. An internal drum chamber is formed between cover assembly 430 and second shaft 416. Flow control valve assembly 570 is fixed via a splined connection 571 to a valve-mounting extension 437 of second cover plate 436. Thus, second cover plate 436 and flow control valve assembly 570 are rotatable relative second shaft 416, and flow control valve assembly 570 is axially slidable along spline connection 571 relative second cover plate 436.

Transfer clutch 422 is located in the drum chamber and includes a clutch hub 442 fixed via a splined connection 444 to second shaft 416 and a multi-plate clutch pack 446. Clutch pack 446 includes a plurality of inner clutch plates 448 splined to clutch hub 442 and which are alternately interleaved with a plurality of outer clutch plates 450 splined to outer drum 432. Lubrication ports 452 and 454 formed through clutch hub 442 and outer drum 432, respectively, are provided for supplying hydraulic fluid to a portion of the drum chamber, hereinafter referred to as clutch chamber 456, for lubricating and cooling clutch pack 446.

Piston assembly 426 is comprised of a piston housing 458 that is fixed via a splined connection 460 for rotation with outer drum 432, and a piston 462 disposed in an annular piston chamber 464 formed in piston housing 458. Piston 462 has a cover material, such as rubber, bonded thereto to provide for sealed sliding engagement with respect to inner and outer edge surfaces of piston chamber 464. Thus, piston 462 is supported for axial sliding movement within piston chamber 464 for applying a compressive clutch engagement force on clutch pack 446, thereby transferring drive torque from second shaft 416 (via clutch hub 442) to first shaft 414 (via cover assembly 430) or vise versa. The amount of drive torque transferred is progressive in that it is proportional to the magnitude of the clutch engagement force exerted by piston 462 on clutch pack 446 which, in turn, is a function of the fluid pressure within piston chamber 464. In this regard, the magnitude of the fluid pressure delivered by hydraulic pump 424 to piston chamber 464 is determined by flow control valve assembly 570, the position of which is controlled by flow control module 160.

Like the prior versions of the invention, the hydraulic coupling 410 operates actively or passively, depending on the state of flow control module 160. When flow control module 160 is "on" or controlling flow control valve assembly 570, flow control module 160 actively positions flow control valve element 572 of flow control valve assembly 570 in response to system information monitored by flow control module 160 including the speed differential between first shaft 414 and second shaft 416. Thus, in the "on" state, the magnitude of the fluid pressure delivered by hydraulic pump 424 to piston chamber 464 is regulated by flow control valve assembly 570. In the "off" state, flow control valve element 572 is statically positioned. For example, the valve element may restrict, either partially or completely, flow passage 574, or valve element 572 may be withdrawn completely from flow passage 574, allowing unrestricted flow therethrough. Preferably, in the "off" state, flow control module 160 moves valve element 572 to a known position corresponding to a predetermined partial restriction of flow restriction passage 574. Where valve element 572 partially restricts flow in passage 574, the fluid pressure delivered by hydraulic pump 424 to piston chamber 464 is essentially a function of the speed differential between first shaft 14 and second shaft 16, whereby the area of flow in restriction passage 574 allowed by valve element 572 corresponds to commencement of coupling between shafts 414 and 416. Also, where the valve element 572 is in either of its extreme positions, completely blocking or allowing unrestricted flow through flow passage 574, hydraulic pump 424 will either dead-head or short-circuit, respectively.

Piston housing 458 has a valving arrangement, similar to that provided in the prior embodiments, that is operable for controlling the delivery of fluid under pressure from hydraulic pump 424 to piston chamber 464. Thus, with reference to FIG. 2, and employing the same reference numerals for the same parts, a pair of transfer ports 76a and 76b are formed through piston housing 458 and extend between and communicate with a corresponding one of pump outlet slots 78a and 78b and piston inlet slots 80a and 80b. In addition, a check valve 82 is mounted by rivets 84 in a shallow bridge groove 86 which communicates with both piston inlet slots 80a and 80b. Preferably, check valve 82 is a reed-type valve element that is symmetrical relative to a central alignment tab 88.

Based on the direction of relative rotation between shafts 414 and 416 (which results in a corresponding directional rotation of hydraulic pump 424 in a first direction), one terminal end 83a of check valve 82 will resiliently deflect to an "open" position away from piston housing 458 and its corresponding transfer port 76a due to the pumping action of hydraulic pump 424 for permitting the flow of hydraulic fluid from the corresponding pump outlet slot 78a into piston chamber 464. Concurrently, the other terminal end 83b of check valve 82 is maintained in a "closed" position relative to piston housing 458 for inhibiting the discharge of hydraulic fluid from piston chamber 464 into the other pump outlet slot 78b through transfer port 76b. During the opposite direction of relative rotation between shafts 414 and 416, the open and closed positions mentioned above for check valve 82 are reversed with respect to transfer ports 76a and 76b. Upon cessation of the pumping action, both terminal ends 83a and 83b of check valve 82 are biased to return to their respective closed positions for maintaining a supply of fluid in piston chamber 464. Thus, check valve 82 functions as a normally-closed check valve. Optionally, separate check valves can be used in association with transfer ports 76a and 76b if so desired.

With continued reference to FIG. 2, piston housing 458 also includes a pair of outlet ports 90a and 90b, which communicate with a corresponding one of pump outlet slots 78a and 78b and a chamfered bridge slot 92. The valving arrangement associated with piston housing 458 further includes a control valve 94 mounted by rivets 96 within bridge slot 92 and which is operable for setting the predetermined minimum pressure within piston chamber 464 at which transfer clutch 422 is initially actuated.

In one variation of the invention, control valve 94 is a bimetallic valve element that is normally maintained with both of its terminal ends 96a and 96b in an "open" position displaced from piston housing 458 for permitting flow of hydraulic fluid into piston chamber 464 through one of outlet ports 90a and 90b while also permitting flow of hydraulic fluid out of piston chamber 464 to a lower pressure section of hydraulic pump 424 through the other of outlet ports 90a and 90b. Because control valve 94 is a bimetallic valve element, the different thermal expansion coefficients of its laminated valve strips cause its terminal ends to move as the temperature varies for maintaining consistent discharge flow through outlet ports 90a and 90b as the viscosity of the hydraulic fluid changes in response to temperature variations. Where control valve 94 is a bimetallic valve, flow control module 560 need not monitor fluid temperature, nor position flow control valve assembly 570 to accommodate the change in viscosity. Such an arrangement is particularly useful in a self-contained actuator assembly 420, as described previously, where monitoring the fluid temperature is more difficult, but can also be employed in hydraulic couplings that draw fluid from a sump, as described here.

Once the fluid in piston chamber 464 exceeds a predetermined minimum pressure value, terminal end of control valve 94 controlling flow out of piston chamber 464 moves to its "closed" position against piston housing 466 for inhibiting fluid flow through the corresponding outlet port. As such, a significant pressure increase occurs in piston chamber 464 which causes piston 462 to apply a corresponding clutch engagement force on clutch pack 446 and actuate transfer clutch 422. Together, the pumping action of hydraulic pump 424 and the position of the flow control valve element 572 cause fluid in piston chamber 464 to exceed the predetermined minimum pressure. Accordingly, when the flow control module 160 is "on", actuation of the transfer clutch 422 is controlled by the position of the flow control valve element 572 as fluid pressure changes in response to the speed differential between shafts 414 and 416. Conversely, when the flow control module 160 is "off", actuation of the transfer clutch 422 occurs when the speed differential, and thus the pumping action of hydraulic pump 424, exceeds a predetermined minimum ΔRPM value.

As is also seen in FIG. 2, terminal ends 96a and 96b of control valve 94 are each formed to include a small bleed passage or slot 92 that permit a small amount of bleed flow out of piston chamber 464 even when control valve 486 is closed. This continuous bleed flow provides a gradual release of the fluid pressure in piston chamber 464 after cessation of the pumping action for disengaging transfer clutch 422. As noted, opposite relative rotation between shafts 414 and 416 will result in the opened and closed positions of terminal ends 96a and 96b of control valve 94 being reversed.

Hydraulic pump 424 is operable for pumping hydraulic fluid through transfer ports 76a and 76b and into piston chamber 464, as regulated by flow control module 160 through flow control valve assembly 570, for actuating transfer clutch 422 in response vehicle system conditions including the magnitude of the differential rotation ΔRPM between shafts 414 and 416. Hydraulic pump 424 is installed in the cover assembly 430 and, preferably, includes a gerotor pump assembly 494 and a pump housing 496.

Gerotor pump assembly 494 of hydraulic coupling 410 is identical to that described for hydraulic couplings 10 and 210. Accordingly, reference to FIG. 3 and the earlier description provides the preferred embodiment of pump assembly 494.

Figure 10:
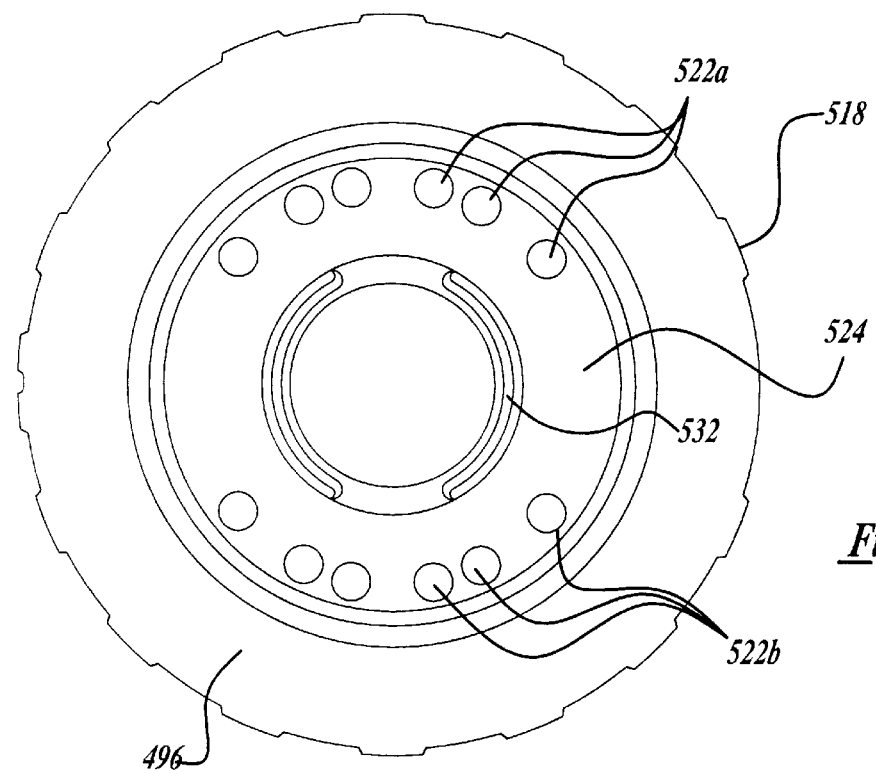
FIGS. 10 and 11 are opposite side views of the pump housing associated with the hydraulic coupling of FIG. 9.
Figure 11:
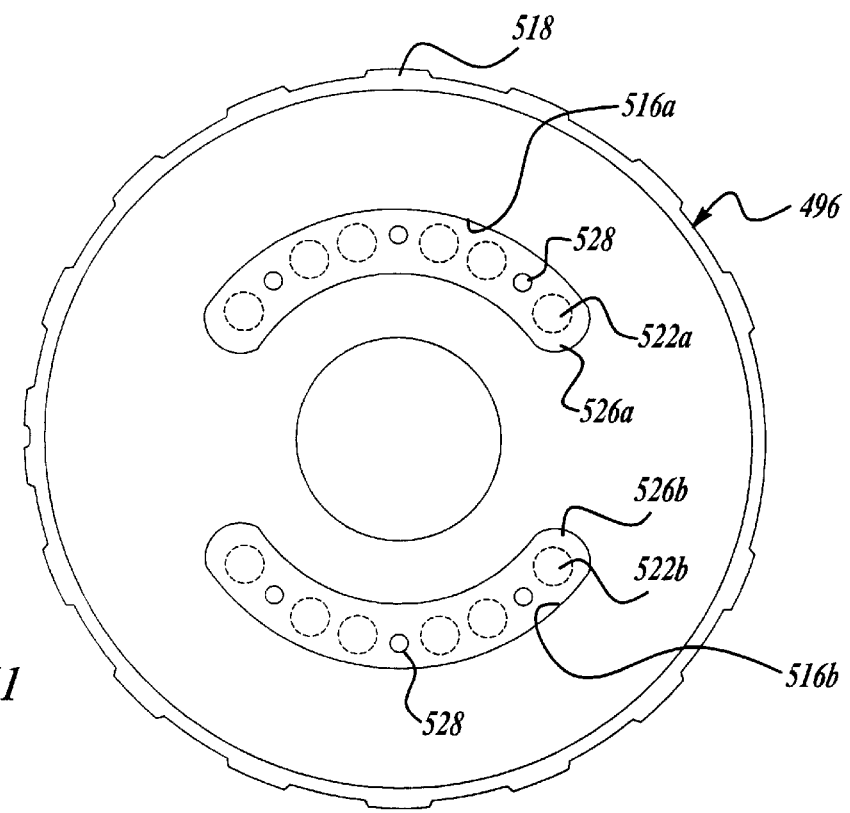

Referring to FIG. 8, gerotor pump assembly 494 is operably installed between piston housing 458 and pump housing 496. Pump housing 496 is likewise shown to have its outer peripheral surface fixed via a splined connection 518 for rotation with outer drum 432 while its inner peripheral surface is journally supported for rotation relative to second shaft 416 and is sealed relative thereto by an O-ring seal 520. As seen in FIGS. 9, 10 and 11, pump housing 496 is formed to include a series of inlet ports 522a and 522b formed respectively within pump inlet slots 516a and 516b to provide fluid communication with an annular supply chamber 524 located on a supply side of gerotor pump assembly 494 and which is defined between pump housing 496 and second cover plate 436. Check valves 526a and 526b are mounted by rivets 528 within corresponding pump inlet slots 516a and 516b for controlling the delivery of fluid from supply chamber 524 through inlet ports 522a and 522b into pump inlet slots 516a and 516b. Check valves 526a and 526b are preferably elongated reed valve elements which overlie inlet ports 522a and 522b and which are movable on rivets 528 from a "closed" position abutting pump housing 496 to an "open" position displaced from pump housing 496 in response to pumping action of gerotor pump assembly 494. Rotation in a first direction causes check valve 526a to move to its open position while check valve 526b is maintained in its closed position. Opposite rotation causes opposite movement of check valves 526a and 526b. Upon cessation of the pumping action, check valves 526a and 526b return to their normally closed positions for maintaining a supply of fluid within pump inlet slots 516a and 516b.

With reference to FIGS. 9 and 10, hydraulic coupling 410 includes an actuating assembly 420 having an inlet check valve 530 is mounted on a bifurcated rim segment 532 of pump housing 496 to permit fluid to be drawn from an inlet passage 534 formed in second shaft 416 into supply chamber 524. Check valve 530 is a ring member having a pair of resiliently deformable "duckbill" valve segments 536 with inlet slits 538 formed therein. Pumping action of hydraulic pump 424 causes slits 538 to open and permit fluid to be drawn from inlet passage 534 into supply chamber 524. Slits 538 are normally closed to prevent the flow of fluid from supply chamber 524 into inlet passage 534. Thus, check valve 530 is normally closed for maintaining a supply of fluid in supply chamber 524.

According to an optional construction, check valve 530 could be a reed-type valve element movable between open and closed positions relative to an inlet port formed through second cover plate 436 to permit fluid to be drawn into supply chamber 524 directly from the sump within driveline apparatus 412 in those application in which supply pump 540 is not available and/or needed.

Driveline apparatus 412 is shown in FIG. 9 to further include a supply pump 540 that is operable for drawing fluid from sump 426 provided within driveline apparatus 412 through an inlet tube 542 and pumping the fluid to a discharge reservoir 544. In particular, supply pump 540 is a shaft-driven hydraulic pump, such as a second gerotor pump assembly, which pumps fluid from discharge reservoir 544 into a fluid pathway formed in second shaft 416 for delivery to inlet passage 534 and lubrication port 452 in clutch hub 442. The fluid pathway is shown to include a radial bore 546, a central longitudinal bore 548 and radial bore 550. A plug 552 with an orifice 554 is retained in bore 548 to direct fluid into inlet passage 534 and radial bore 550.

Flow control valve assembly 570 has a valve body 580 having a radial plate segment 576 which supports valve element 572 and a tubular sleeve segment 578 mounted via splined connection 571 to extension 437 of second cover plate 436. The splined connection 578 of axial portion 578 permits axial movements of flow control valve assembly 570 in response to signals provided by the flow control module 160. The axial movements of the valve body 580 varies the position of the valve element 572 extending perpendicularly from transaxle portion 576 into flow restricting passage 574, which fluidly connects a fluid pathway 575 through actuator assembly 420 and supply chamber 524. Valve element 572 is a cylindrical pin that is slidably received in a valve opening 590 formed through second cover plate 436 of pump housing 502. Valve opening 590 includes an O-ring 592 providing a tight, sealed fit of the valve element 572 in the valve opening 590. Axial movement of the valve body 580 is preferably accomplished by a power-operated positioning system 583, which preferably includes a shift fork 284, shown retained in an annular groove 586 formed in sleeve segment 578 of valve body 580. Shift fork 284, partially shown in FIG. 9, is coupled to positioning system 583, which is capable of controllably sliding valve body 580 in response to signals provided by flow control module 160.

Flow control valve assembly 570 is axially moveable to a first extreme position in which valve element 572 is fully retracted from flow passage 574, as shown in FIG. 9, for providing unrestricted flow of fluid through fluid pathway 575 from piston chamber 464 to supply chamber 524, thereby short-circuiting hydraulic pump 424. In an opposite second extreme position, valve element 572 blocks flow passage 574 stopping fluid flow in the sealed actuator from piston chamber 64 to supply chamber 524, similar to such position for valve element 272 of the prior embodiment as illustrated in FIG. 7. Between the defined extreme positions, valve element 572 variably restricts the flow of fluid from piston chamber 464 to supply chamber 524 in response to position signals from flow control module 160. Thus, based on system information including speed differential between shafts 414 and 416, flow control module 160 is able to control the transfer of drive torque from a faster rotating shaft to a slower rotating shaft by appropriately positioning valve element 572. As before, the flow area of passage 574 between fluid pathway 575 and supply chamber 524 in second cover plate 436, as varied by signals set to positioning system 583 by flow control module 160, as well as the relationship between the flow areas of transfers port 76, outlet ports 90, and bleed slots 98, further in conjunction with the operational characteristics of control valve 94, permit hydraulic coupling 410 to be calibrated to define the particular speed differential value between shafts 414 and 416 at which torque transfer commences, as well as to actively tune the torque transfer. Flow control module 160 actively tunes hydraulic coupling 410 through movement of flow control valve assembly 570 based on monitored fluid characteristics and engine performance.

Figure 12:
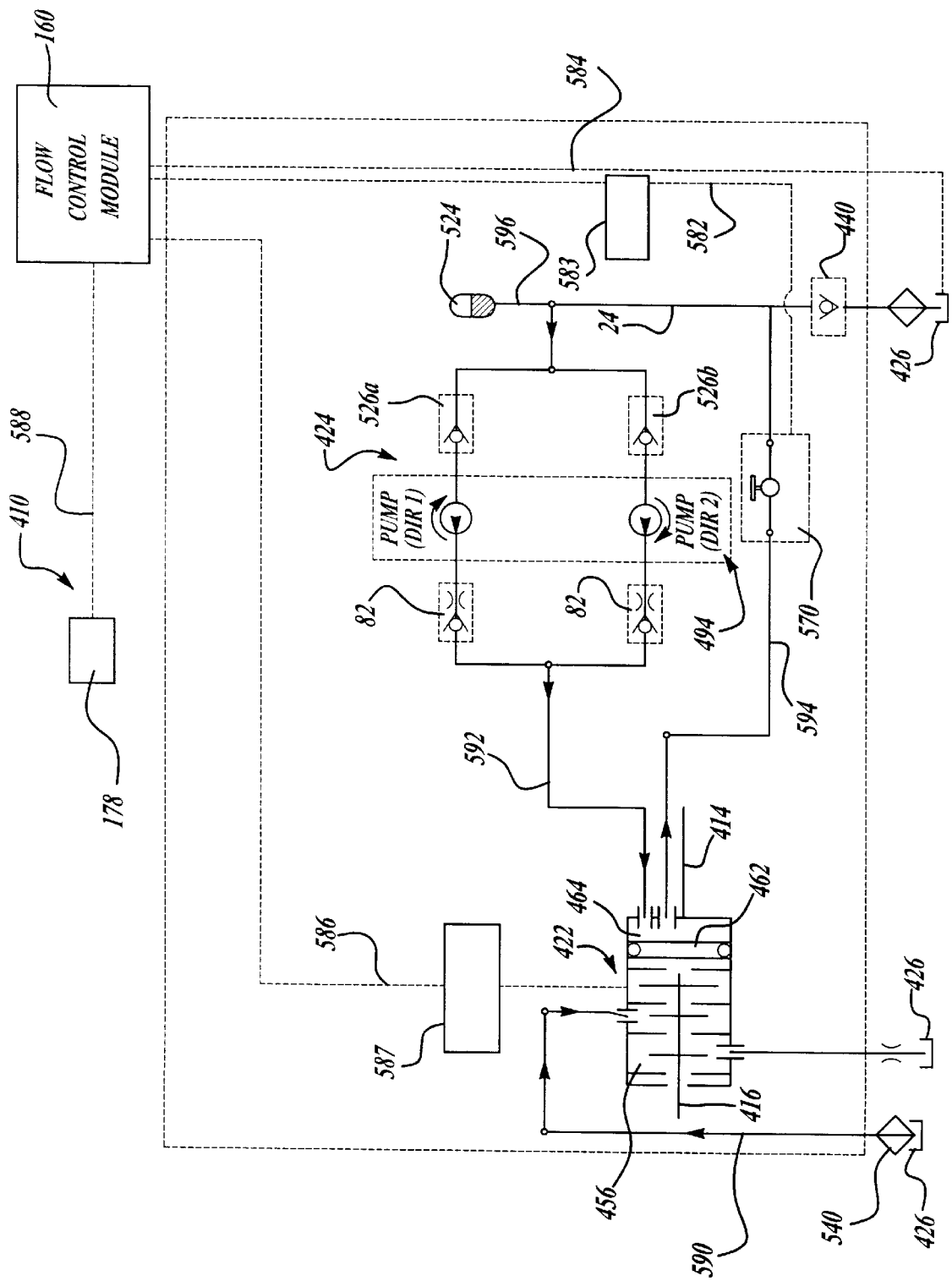
FIG. 12 is a schematic illustration of a hydraulic circuit associated with the hydraulic coupling of FIG. 9.

Hydraulic coupling 410 is illustrated schematically in FIG. 12. Like the previously described flow control modules, flow control module 160 of hydraulic coupling 410 monitors vehicle system information including information from any electronic control module and the difference in rotational velocity between first and second rotating shafts 414 and 416, preferably including hydraulic fluid temperature in actuator assembly 420.

As before, flow control module 160 for hydraulic coupling 410 preferably includes sensing devices that continuously measure operating conditions, including other electronic control modules, evaluates the sensor inputs using data tables and calculations. Flow control module 160 determines the output signal delivered to an electrically operated actuator of positioning system 583 such that valve element 572 moves in response to such signals.

With reference to FIG. 12, hydraulic coupling 410 is schematically shown to include transfer clutch 422 coupled between first shaft 414 and second shaft 416, hydraulic pump 424, piston 462 disposed in piston chamber 464, and flow control valve assembly 570 for regulating the fluid pressure delivered by hydraulic pump 424 to piston chamber 464. A first flow path 596 supplies hydraulic fluid from supply chamber 524 located on the suction side of pump assembly 424, and a second flow path 592 supplies hydraulic fluid from pump assembly 424 to piston chamber 464 located on the discharge side of hydraulic pump 424. Supply chamber 524 is fed hydraulic fluid from sump 426 via secondary pump 440. A third flow path 594 returns fluid to supply chamber 524 and sump 426. Flow control valve assembly 570 is located in third flow path 594 and is operable to vary the flow of fluid therein. A first lubricant fluid flow path 590 includes lube pump 540 for drawing lubricant fluid from sump 426 and for supplying lubricant fluid to cool transfer clutch 422. The lubricant fluid is returned to sump 426 via second lubricant fluid flow path 591.

Flow control valve assembly 570 is connected to an actuator associated with positioning system 583, which receives control signals from flow control module 160 via a first electrical connection 582. Flow control module 160 controls the position of valve element 572 in response to sensory inputs monitored by flow control module 160. Second electrical connection 584 allows flow control module 160 to monitor fluid temperature in sump 426. Third electrical connection 586 permits flow control module to monitor a difference in rotation of velocity between first and second shafts 414 and 416 based on speed signals generated by speed sensors 587. Fourth electrical connection 588 permits flow control module 160 to monitor one or more vehicle electronic control modules 178. For purposes of this description, only one vehicle electronic control module 178 has been shown with the understanding that more electronic control modules may be monitored with each having their own electrical connection to flow control module 160. Based on the one or more monitored sensory inputs, flow control module 160 positions valve assembly 570 according to programmed instructions contained in its memory, as described fully above.

Based on this disclosure, those skilled in the art should appreciate that a hydraulic coupling constructed according to the present invention can be used in motor vehicle driveline applications for limiting slip and transferring torque between two relatively rotatable members. In this regard, the driveline apparatus is intended to be indicative of, but not limited to, axle differentials, transaxles differentials, all-wheel drive power take-offs and in-line couplings, on-demand transfer cases and the like. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a driveline apparatus for a motor vehicle having a casing containing hydraulic fluid to rotatively couple first and second rotary members, the hydraulic coupling comprising:

a cover assembly at least partially defining a sealed cavity;

a transfer clutch operatively connectable between the first and second rotary members;

a piston housing defining a piston chamber;

a piston disposed in said piston chamber and actuable to engage said transfer clutch and rotatively couple the first and second rotary members;

a hydraulic pump for providing a pumping action in response to relative rotation between the first and second rotary members;

a fluid flow path for supplying hydraulic fluid from a supply chamber to said hydraulic pump, from said hydraulic pump to said piston chamber, and returning said hydraulic fluid from said piston chamber to said supply chamber, said fluid path generally extending within said sealed cavity;

an electrically powered mover disposed in said sealed cavity and located in said flow path, said electrically powered mover regulating flow of hydraulic fluid through said fluid flow path to control the pressure in said piston chamber for actuating said piston; and a flow control module monitoring operating conditions of said motor vehicle and controlling said electrically powered mover in response to said operating conditions.

2. A hydraulic coupling according to claim 1, wherein said flow control module controls said electrically powered mover through a controller.

3. A hydraulic coupling according to claim 2, wherein said controller is a solenoid.

4. A hydraulic coupling according to claim 2, wherein said controller is a fork and sleeve positioning system.

5. A hydraulic coupling according to claim 1, wherein said hydraulic pump and said supply chamber are disposed in said sealed cavity.

6. A hydraulic coupling according to claim 1, further comprising a pump housing fixed for rotation with said cover assembly, said pump housing at least partially defining said supply chamber.

7. A hydraulic coupling according to claim 1, wherein said piston housing partially defines said sealed cavity.

8. A hydraulic coupling according to claim 1 further comprising a sump in fluid communication with said supply chamber, whereby said first flow path supplies hydraulic fluid from said sump to said hydraulic pump.

9. A hydraulic coupling according to claim 8 wherein said sump supplies fluid to a clutch chamber for cooling clutch plates of said transfer clutch.

10. A hydraulic coupling according to claim 1, wherein said flow control module actively positions said electrically powered mover in response to said operating conditions and programmed instructions to regulate the pressure in said piston chamber for actuating said piston.

11. A hydraulic coupling according to claim 1, wherein said flow control module positions said electrically powered mover to passively control the pressure in said piston chamber.

12. A hydraulic coupling according to claim 11, wherein said flow control module positions said electrically powered mover to partially restrict said flow path to passively control the pressure in said piston chamber.

13. A hydraulic coupling according to claim 1 further comprising a pressure control valve associated with said piston chamber for relieving fluid pressure in said piston chamber when said fluid pressure reaches a predetermined pressure value.

14. A hydraulic coupling according to claim 13 wherein said pressure control valve is a bimetallic valve element.

15. A hydraulic coupling according to claim 14 wherein the bimetallic valve element includes laminated valve strips of differing thermal expansion coefficients.

16. A hydraulic coupling according to claim 1 wherein said hydraulic pump includes a first pump component coupled for rotation with said first rotary member and a second pump component coupled for rotation with said second rotary member, said hydraulic pump operative for pumping hydraulic fluid into said piston chamber in response to speed differentiation between said first and second pump components.

17. A hydraulic coupling according to claim 16 wherein said second pump component includes a pump ring having external teeth formed thereon and said first pump component includes an eccentric ring defining an internal bore that is off-set from a rotational axis of said pump ring, said bore of said eccentric ring mounting a stator ring having internal lobes in meshed engagement with said teeth on said pump ring, whereby relative rotation between said pump ring and said eccentric ring pumps fluid under pressure to said piston chamber.

18. A hydraulic coupling according to claim 1, wherein said flow control module is connected to at least one of a hydraulic fluid temperature sensor, a speed differential sensor, and a motor vehicle electronic control module for monitoring said operating conditions, whereby said flow module controls said electrically powered mover in response to said operating conditions.

19. A hydraulic coupling according to claim 18, wherein said flow control module is electrically connected to said hydraulic fluid temperature sensor, said speed differential sensor, said motor vehicle electronic control module, and said electrically powered mover, whereby said flow control module controls said electrically powered mover in response to said operating conditions sensed from said hydraulic fluid temperature sensor, speed differential sensor, and motor vehicle electronic control module.

20. A hydraulic coupling according to claim 18 wherein said flow control module is connected to more than one motor vehicle electronic control module.

21. A hydraulic coupling for use in a driveline apparatus for a motor vehicle having a casing containing hydraulic fluid to rotatively couple first and second rotary members, the hydraulic coupling comprising:

a transfer clutch operatively connected between the first and second rotary members;

a piston housing defining a piston chamber;

a piston disposed in said piston chamber and actuable to engage said transfer clutch and rotatively couple the first and second rotary members;

a hydraulic pump for providing a pumping action in response to relative rotation between the first and second rotary members;

a fluid flow path for supplying hydraulic fluid from a supply chamber to said hydraulic pump, from said hydraulic pump to said piston chamber, and returning said hydraulic fluid from said piston chamber to said supply chamber;

a flow control valve assembly located in said flow path and defining a valve chamber which is in fluid communication with said flow path, said flow control valve assembly having a flow control valve for regulating flow of hydraulic fluid into said valve chamber to control the pressure in said piston chamber for actuating said piston; and a flow control module monitoring operating conditions of said motor vehicle and controlling said flow control valve in said control valve assembly in response to said operating conditions, wherein said flow control module controls said flow control valve through a controller, wherein said controller is a fork and sleeve positioning system.

22. A hydraulic coupling for use in a driveline apparatus for a motor vehicle having a casing containing hydraulic fluid to rotatively couple first and second rotary members, the hydraulic coupling comprising:

a transfer clutch operatively connected between the first and second rotary members;

a piston housing defining a piston chamber;

a piston disposed in said piston chamber and actuable to engage said transfer clutch and rotatively couple the first and second rotary members;

a hydraulic pump for providing a pumping action in response to relative rotation between the first and second rotary members;

a fluid flow path for supplying hydraulic fluid from a supply chamber to said hydraulic pump, from said hydraulic pump to said piston chamber, and returning said hydraulic fluid from said piston chamber to said supply chamber;

a flow control valve assembly located in said flow path and defining a valve chamber which is in fluid communication with said flow path, said flow control valve assembly having a flow control valve for regulating flow of hydraulic fluid into said valve chamber to control the pressure in said piston chamber for actuating said piston; and a flow control module monitoring operating conditions of said motor vehicle and controlling said flow control valve in said control valve assembly in response to said operating conditions, wherein said flow control module is connected to at least one of a hydraulic fluid temperature sensor, a speed differential sensor, and a motor vehicle electronic control module for monitoring said operating conditions, whereby said flow module controls said flow control valve in response to said operating conditions, wherein said flow control module is connected to more than one motor vehicle electronic control module.

23. A hydraulic coupling for use in a driveline apparatus for a motor vehicle having a casing containing hydraulic fluid to rotatively couple first and second rotary members, the hydraulic coupling comprising:

a cover assembly at least partially defining a sealed cavity;

a transfer clutch operatively connectable between the first and second rotary members;

a piston housing defining a piston chamber;

a piston disposed in said piston chamber and actuable to engage said transfer clutch and rotatively couple the first and second rotary members;

a hydraulic pump for providing a pumping action in response to relative rotation between the first and second rotary members;

a first flow path for supplying hydraulic fluid from a supply chamber to said hydraulic pump;

a second flow path for supplying hydraulic fluid from said hydraulic pump to said piston chamber;

a third flow path for supplying hydraulic fluid from said piston chamber to said supply chamber;

an electrically powered mover disposed in said sealed cavity and located in said third flow path, said electrically powered mover regulating flow of hydraulic fluid through said fluid flow path to control the pressure in said piston chamber for actuating said piston; and a flow control module including a memory and a microcontroller, said memory including programmed instructions, said microcontroller monitoring operating conditions of said motor vehicle and controlling said electrically powered mover in response to said operating conditions and said programmed instructions.

24. A hydraulic coupling according to claim 23 further comprising a pressure control valve associated with said piston chamber for relieving fluid pressure in said piston chamber when said fluid pressure reaches a predetermined pressure value.

25. A hydraulic coupling according to claim 24 wherein said pressure control valve is a bimetallic valve element.

26. A hydraulic coupling according to claim 25 wherein the bimetallic valve element includes laminated valve strips of differing thermal expansion coefficients.

27. A hydraulic coupling according to claim 23 wherein said flow control module is connected to at least one of a hydraulic fluid temperature sensor, a speed differential sensor, and a motor vehicle electronic control module for monitoring said operating conditions, whereby said flow module controls said flow control valve in response to said operating conditions.

28. A hydraulic coupling according to claim 27, wherein said flow control module is electrically connected to said hydraulic fluid temperature sensor, said speed differential sensor, said motor vehicle electronic control module, and said electrically powered mover, whereby said flow control module controls said electrically powered mover in response to said operating conditions sensed from said hydraulic fluid temperature sensor, speed differential sensor, and motor vehicle electronic control module.

29. A hydraulic coupling according to claim 27, wherein said flow control module is connected to more than one vehicle electronic control module.

30. A hydraulic coupling for use in a driveline apparatus for a motor vehicle having a casing containing hydraulic fluid to rotatively couple first and second rotary members, the hydraulic coupling comprising:

a transfer clutch operatively connected between the first and second rotary members;

a piston housing defining a piston chamber;

a piston disposed in said piston chamber and actuable to engage said transfer clutch and rotatively couple the first and second rotary members;

a hydraulic pump for providing a pumping action in response to relative rotation between the first and second rotary members;

a first flow path for supplying hydraulic fluid from a supply chamber to said hydraulic pump;

a second flow path for supplying hydraulic fluid from said hydraulic pump to said piston chamber;

a third flow path for supplying hydraulic fluid from said piston chamber to said supply chamber;

a flow control valve assembly located in said third flow path and defining a valve chamber which is in fluid communication with said third flow path, said flow control valve assembly having a flow control valve for regulating flow of hydraulic fluid into said valve chamber to control the pressure in said piston chamber for actuating said piston; and a flow control module including a memory and a microcontroller, said memory including programmed instructions, said microcontroller monitoring operating conditions of said motor vehicle and controlling said flow control valve in said control valve assembly in response to said operating conditions and said programmed instructions, wherein said flow control module is connected to at least one of a hydraulic fluid temperature sensor, a speed differential sensor, and a motor vehicle electronic control module for monitoring said operating conditions, whereby said flow module controls said flow control valve in response to said operating conditions, wherein said flow control module is connected to more than one motor vehicle electronic control module.

31. A hydraulic coupling for rotatively coupling a first rotary member and a second rotary member in a motor vehicle, the hydraulic coupling comprising:

a coupling housing defining an at least partially sealed cavity;

a clutch positioned in said at least partially sealed cavity, said clutch operable to selectively couple the first rotary member and the second rotary member;

a piston assembly having a piston slidably disposed in a piston chamber, said piston assembly operable to selectively engage said clutch in response to a hydraulic pressure;

an internal fluid path extending between a supply chamber, a hydraulic pump, said piston chamber, and back to said supply chamber;

an electrically powered mover being contained within said at least partially sealed cavity, said electrically powered mover being disposed within said internal fluid path and positionable in an opened position to permit fluid flow through said internal fluid path and a closed position, thereby regulating flow of hydraulic fluid into said piston chamber for actuating said piston and said clutch; and a flow control module monitoring operating conditions of the motor vehicle, said flow control module controlling said electrically powered mover in response to said operating conditions.

32. The hydraulic coupling according to claim 31 wherein said flow control module controls said electrically powered mover through a controller.

33. The hydraulic coupling according to claim 32 wherein said controller is a fork and sleeve positioning system.

34. The hydraulic coupling according to claim 32 wherein said controller is a solenoid.

35. The hydraulic coupling according to claim 31, further comprising:

a hydraulic pump capable of providing a pumping action in response to relative rotation between the first and second rotary members, said hydraulic pump and said supply chamber are each disposed in said sealed cavity.

36. The hydraulic coupling according to claim 35, further comprising:

a sump in fluid communication with said supply chamber, said internal fluid path supplies hydraulic fluid from said sump to said hydraulic pump.

37. The hydraulic coupling according to claim 31 wherein said flow control module actively positions said electrically powered mover in response to said operating conditions and programmed instructions to regulate the pressure in said piston chamber for actuating said piston.

38. The hydraulic coupling according to claim 31 wherein said flow control module positions said electrically powered mover to partially restrict said fluid flow path to passively control the pressure in said piston chamber.

39. The hydraulic coupling according to claim 31, further comprising:

a pressure control valve associated with said piston chamber for relieving fluid pressure in said piston chamber when said fluid pressure reaches a predetermined pressure value.

40. The hydraulic coupling according to claim 39 wherein said pressure control valve is a bimetallic valve element.

41. The hydraulic coupling according to claim 40 wherein the bimetallic valve element includes laminated valve strips of differing thermal expansion coefficients.

42. The hydraulic coupling according to claim 31 wherein said flow control module is connected to at least one of a hydraulic fluid temperature sensor, a speed differential sensor, and a motor vehicle electronic control module for monitoring said operating conditions, said flow module controls said electrically powered mover in response to said operating conditions.

43. The hydraulic coupling according to claim 42 wherein said flow control module is connected to more than one motor vehicle electronic control module.

44. The hydraulic coupling according to claim 31 wherein said flow control module is electrically connected to said hydraulic fluid temperature sensor, said speed differential sensor, said motor vehicle electronic control module, and said electrically powered mover, whereby said flow control module controls said electrically powered mover in response to said operating conditions sensed from said hydraulic fluid temperature sensor, speed differential sensor, and motor vehicle electronic control module.

* * * * *